(12) United States Patent
Okada et al.

(10) Patent No.: US 6,839,144 B2
(45) Date of Patent: Jan. 4, 2005

(54) OPTICAL DISPLACEMENT SENSOR

(75) Inventors: Michitoshi Okada, Kyoto (JP);
Tatsuya Matsunaga, Kyoto (JP);
Masahiro Kawachi, Kyoto (JP);
Mitsuharu Mano, Kyoto (JP)

(73) Assignee: Omron Corporation, Kyoto (JP)

( * ) Notice: Subject to any disclaimer, the term of this patent is extended or adjusted under 35 U.S.C. 154(b) by 255 days.

(21) Appl. No.: 10/106,883

(22) Filed: Mar. 22, 2002

(65) Prior Publication Data

US 2002/0167677 A1 Nov. 14, 2002

(30) Foreign Application Priority Data

Mar. 25, 2001 (JP) ........................................ 2001-133388

(51) Int. Cl.[7] .............................................. G01B 11/24
(52) U.S. Cl. ...................................... 356/606; 382/154
(58) Field of Search ................................ 356/602–608; 382/154

(56) References Cited

U.S. PATENT DOCUMENTS 4,666,303 A * 5/1987 Pryor ........................ 356/606
6,503,195 B1 * 1/2003 Keller et al. ................ 600/160

FOREIGN PATENT DOCUMENTS

JP 6-58726 3/1994
JP 2000-230814 8/2000

* cited by examiner

Primary Examiner—Richard A. Rosenberger
(74) Attorney, Agent, or Firm—Beyer Weaver & Thomas LLP

(57) ABSTRACT

An optical displacement sensor takes in a plurality of images of a target object by projecting a slit beam of light and using a two-dimensional image taking element by changing the image taking conditions each time. Parameters defining these conditions affecting the brightness of the obtained image are varied. From each of these images including an image of a portion of the sectional contour line of the target object, a segmented image satisfying a specified maximum brightness condition is extracted and a synthesized image is generated by gathering such segmented images. The target object is inspected from such synthesized image.

31 Claims, 29 Drawing Sheets

DATA UPDATE 1

FINALIZATION FLAG- NOT FINALIZED
PEAK VALUE- VALUE OBTAINED THIS TIME
PEAK POSITION- POSITION OBTAINED THIS TIME
MODE- CURRENT MODE

*FIG. 11A*

DATA UPDATE 2

FINALIZATION FLAG- FINALIZED
PEAK VALUE- VALUE OBTAINED THIS TIME
PEAK POSITION- POSITION OBTAINED THIS TIME
MODE- CURRENT MODE

*FIG. 11B*

DATA UPDATE 3

FINALIZATION FLAG- FINALIZED
PEAK VALUE- VALUE HELD IN REGISTER
PEAK POSITION- POSITION HELD IN REGISTER
MODE- MODE HELD IN REGISTER

*FIG. 11C*

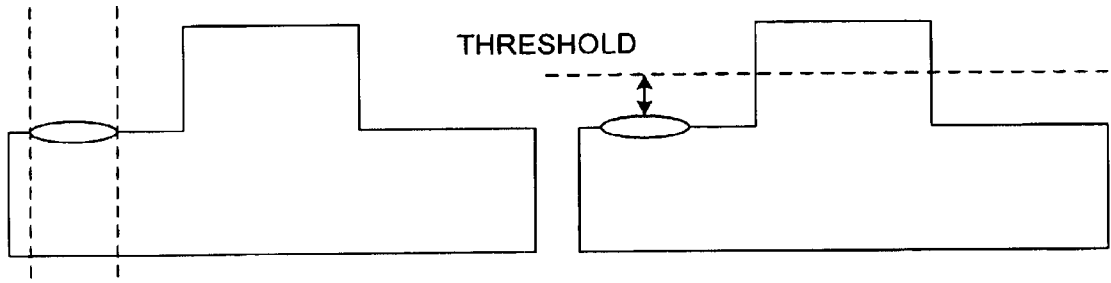
FIG. 36A  FIG. 36B
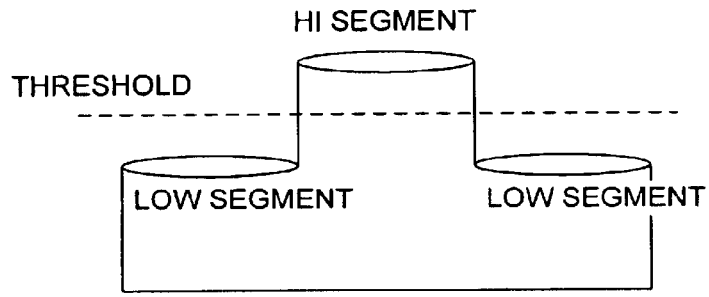
FIG. 37A
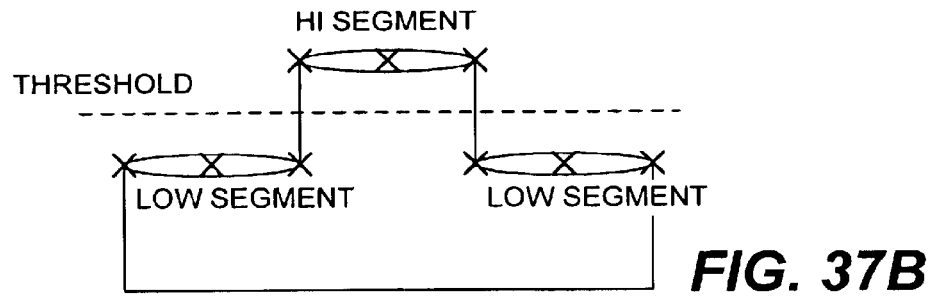
FIG. 37B
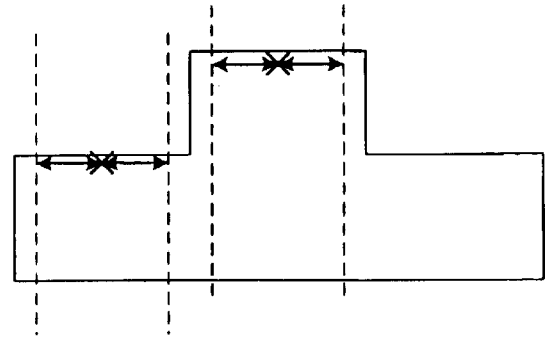
FIG. 37C

OPTICAL DISPLACEMENT SENSOR

BACKGROUND OF THE INVENTION

This invention relates to an optical displacement sensor for inspecting the sectional contour shape of a target object. In particular, this invention relates to such an optical sensor capable of inspecting with a high level of precision the sectional contour shape of a target object of a kind that is so formed that a contour image with uniform density of an optically sectioning surface is difficult to obtain because of its surface characteristics.

There has been known a prior art optical displacement sensor for such a purpose characterized as comprising a light projecting means for forming a slit beam of light from a light source and projecting this beam onto a target object at a specified angle, an imaging means for obtaining an image of a sectional contour line of the target object by an optically sectioning plane by using a two-dimensional image taking element from a different angle to photograph the position of incidence of the slit beam on the target object, and a measuring means for carrying out a specified process on the image of the contour line obtained by the imaging means and thereby generating a measured value and/or a judgment value. The direction of the sectional surface by the slit beam of light corresponds to the direction of the perpendicular scanning within the field of view of the two-dimensional image taking element. When the distance between the measuring device and the target object is changed, the image of the sectional contour line formed by the slit beam moves on the light receiving surface of the two-dimensional image taking element in the same direction as that of the horizontal scan line.

With such a sensor, data on a series of target points on a straight line on the surface of the target object can be obtained summarily without moving the projected light relative to the target object because a slit beam with a cross-sectional shape of a straight line is used, instead of spot light with a point cross-section. Thus, if such a sensor is used for the inspection of industrial products being transported along a production line, defective products can be quickly and dependably identified by accurately measuring various parts of their surfaces.

Industrial products come in different forms and shapes, including those having non-uniform surface conditions such as surface roughness and color such that the reflectivity is not uniform. For such a product, let Area A be a portion of its surface with high reflectivity and Area B be another portion with low reflectivity. If the two-dimensional image taking element is adjusted such that the image of Area A will come out clearly, the brightness (or clearness) of image of Area B will be insufficient. If the element is adjusted such that the image of Area B will come out clearly, on the other hand, the image of Area A will be too bright, and an accurate measurement may not be made.

FIGS. 41A and 41B illustrate problems of this kind. FIG. 41A shows on its left-hand side a cross-sectional side view of an object with a left-hand part with high reflectivity and a right-hand part with low reflectivity. Its image taken by a two-dimensional image taking element as explained above is shown on the right-hand side. In this example, an image of the left-hand part of the object is visible but there is not enough reflection of light from the right-hand part and it is not possible to measure the sectional contour line of the right-hand part. In the image on the right-hand side, the horizontal direction represents the direction of the sectioning surface of the slit beam of light, and the vertical direction corresponds to the direction of the height of the target object. The image of the incident beam on the target object should be a straight horizontal line extending all the way on the screen but its right-hand side is not visible in this example because of its low reflectivity. If measurements are taken on the basis of such an image, the height on the left-hand side can be measured but no measurement can be taken on the right-hand side.

FIG. 41B shows another target object having a groove with low reflectivity sandwiched between right-hand and left-hand parts with high reflectivity. The image taken of this object shows that the portion of the groove is missing, as indicated by a dotted circular line, because of its low reflectivity.

In the case of an object with sloped surface portions, the sloped portions tend to have smaller reflectivity, not allowing accurate measurements. FIG. 42A shows an example of such a target object. The image obtained from a two-dimensional image taking element will include three sections which are the image of the slit beam of light made incident on the target object. The image shows that the portions corresponding to the slopes are missing. Thus, the height of the left-hand and right-hand end portions and the higher center part can be measured from the image but a normal measurement cannot be made on the sloped portions because the brightness is not sufficient.

In the case of a target object with a curved surface, as shown in FIG. 42B, the curved portion tends not to reflect light sufficiently. Thus, the portion of the image obtained by a two-dimensional image taking element corresponding to the curved surface may be missing.

SUMMARY OF THE INVENTION

It is therefore an object of this invention to provide an optical displacement sensor using the slit-light method and capable of very accurately measuring a sectional contour line even if the target object has a surface with non-uniform reflectivity, a groove, a sloped surface or a curved surface.

It is another object of the invention to provide such an optical displacement sensor which can make a suitable correction when a portion of the image of a sectional contour line is missing, say, due to noise.

It is still another object of the invention to provide such an optical displacement sensor which, when making a measurement by setting a target area according to a specified portion of an image in the direction of the sectional line of the slit light, is capable of automatically correcting the displacement of the specified portion of the image from the target area.

Other objects and effects of the invention will become evident to a person skilled in the art from the description that follows.

An optical displacement sensor according to this invention may be characterized as comprising multi-imaging means, image synthesizing means and measuring means. The multi-imaging means includes a light projecting means for providing a slit beam of light and projecting the slit beam of light onto a target surface of a target object at a specified angle, image taking means for obtaining contour-including images including an image of a sectional contour line by an optically sectioning surface by using a two-dimensional image taking element at another angle different from the angle of incidence of the slit beam to photograph the target surface where the slit beam of light is made incident, and parameter scanning means for scanning the brightness of the contour-including images by varying the value of at least one of parameters that define image taking conditions affecting the brightness of the contour-including images obtained through the image taking means. The multi-imaging means serves to obtain a plurality of contour-including images with different image taking conditions. The image synthesizing means is for extracting from a plurality of these contour-including images obtained by the multi-imaging means a segmented image satisfying a specified maximum brightness condition for each of predetermined segments and generating a synthesized image including a series of images of portions of the sectional contour line by gathering the extracted segmented images. The measuring means is for carrying out a specified measuring process based on the series of images of portions of the sectional contour line and generating a value representing a result obtained by the specified measuring process.

The measuring means may be for obtaining the distribution of distance between the multi-imaging means and the target surface along a line including the point of incidence of the slit beam by using a series of measured values.

With an optical displacement sensor thus structured, one or more of the parameters defining image taking conditions that affect the brightness of the image of a sectional contour line are changed in order to scan the brightness of the image while taking a plurality of images by the multi-imaging means and a synthesized image is obtained by gathering segmented images each satisfying a specified maximum brightness condition for each of predetermined segments. The synthesized image thus obtained includes a series of images of portions of the sectional contour line. Thus, the measuring means can carry out a specified measuring process based on a bright image formed by assembling a series of images of portions of the sectional contour line and generate thereby an accurate value of a measurement or a judgment.

Various kinds of parameters may be used for the purpose of this invention but the quantity of light from the source and the shutter speed of the two-dimensional image taking element are effective because they can be controlled easily. Other examples include the gain of the amplifier for the light projecting means. If a CCD image sensor is used as the two-dimensional image taking element, use may be made of parameters such as the shutter time of the CCD image sensor, the duty ratio of the projected light pulses, the ratio of amplification of video signals and the peak quantity of light of the projected light pulses.

The parameters may be varied in units. In this case, the units by which the parameter values are changed, as well as the maximum range within which they may be changed, may be made variable such that an image with optimum brightness can be obtained for each area on which the slit beam of light is made incident. The maximum range of the parameters may be made variable automatically according to a test result. This is advantageous because no user input is required for setting such a maximum range even where target objects having significantly different surface conditions are to be measured and an optimum range can be reliably and quickly selected. The units by which the parameter values are changed and/or the maximum range of their changes may be adapted to be automatically adjusted according to the brightness of the portion of the image of the sectional contour line obtained within a specified segment. This is advantageous because the time required for setting them can be saved.

The segments may be preliminarily specified in various ways, depending on the field of vision and the expected position and size of the image of the sectional contour line. If they are specified so as to each consist of an area including one or more mutually adjacent horizontal scan lines on an image obtained by a two-dimensional image taking element, it is convenient because the units in which images are taken and the units in which images are handled can be matched.

The image synthesizing means may comprise an image memory, a flag memory, an image recording means and a flag control means. The image memory is for storing image of one screen portion of the two-dimensional image taking element and is appropriately divided into segments. The flag memory is for storing write-control flags indicating whether or not data may be written into each of these segments of the image memory. The image recording means is for recording the images obtained by the multi-imaging means into the image memory in units of its segments according to the write-control flags. The flag control means is for controlling the write-control flags such that after a segmented image satisfying the specified maximum brightness condition is recorded in each of the segments of the image memory, the flag memory corresponding to the segment is set to inhibit data from being written thereinto. With the image synthesizing means thus structured, images are received from the multi-imaging means and synthesized nearly simultaneously such that the processing time can be reduced.

The processing time can be reduced even further if the multi-imaging means finishes obtaining images at the moment when segmented images satisfying the specified maximum brightness condition are written into all of the segments or all of the expected segments of the image memory. If the segments are specified so as to each consist of an area including one or more mutually adjacent horizontal scan lines on an image obtained by the image taking element of the multi-imaging means, it is convenient because the units in which images are taken match the units in which images are recorded in the image memory. As explained above, the direction of the cross-section of the slit beam is the direction of the perpendicular scan line on the light-receiving surface of the two-dimensional image taking element. When the distance between the measuring device and the target object is changed, the image of the sectional contour line formed by the slit beam moves on the light receiving surface of the two-dimensional image taking element in the same direction as that of the horizontal scan line.

According to a preferred embodiment of the invention, the multi-imaging means is contained in one housing structure to form a sensor head unit, and the image synthesizing means and the measuring means are contained in another housing structure to form a signal processing unit. An image monitor may be made externally connectable to the signal processing unit. In this manner, the sensor head unit may be placed near the target object so as to be convenient for the measurement but the signal processing unit may be placed wherever it is convenient for the operator. With an image monitor connected to the signal processing unit, monitoring of various kinds becomes feasible.

The multi-imaging means described above as a component of an optical sensor may be independently used as a multiple image taking device, comprising components as described above and being contained in a single housing structure to form a sensor head unit.

Similarly, the image synthesizing means and the measuring means described above as components of an optical sensor may be formed as an independent signal processing device, comprising components as described above and being housed in a single housing structure to form a signal processing unit.

The optical sensor of this invention may also include image repairing means for repairing partial defects in the synthesized image of a sectional contour line in a synthesized image generated by the image synthesizing means. If the image of a sectional contour line is missing from any of the segments of a synthesized image no matter how the parameter values are varied, the synthesized image may thus be repaired such that a failure to make measurements on the synthesized image can be prevented.

Various algorithms may be used for the image synthesizing means. According to one of them, the presence or absence of the image of a portion of the sectional contour line is detected sequentially on each of the horizontal scan lines forming the synthesized image and if a line is encountered on which the image of a portion of the sectional contour line is missing, the image on the line scanned immediately before is substituted. According to another algorithm, the substitution is made by considering images of both the line immediately before and a subsequent line. A third method may be to also compare the image on each scan line with a standard value of brightness and make a correction as explained above or not, depending on the continuity in brightness of the images of the sectional contour line before and after the scan line.

The optical sensor of this invention may also include monitor output means for generating output signals for displaying a specified image on a separately provided image monitor. Displays of many kinds may be made on the monitor screen. Firstly, the synthesized image generated by the image synthesizing means itself may be displayed. Secondly, a cursor indicating a selected one of horizontal scan lines from the synthesized image and the brightness distribution curve ("line bright waveform") of the scan line indicated by the cursor may be displayed. Thirdly, a cursor and an output representing the image taking condition (mode) for the scan line indicated by the cursor may be displayed. Fourthly, a mark may be displayed on each scan line where no image of sectional contour line is present. Fifthly, a mark may be displayed on each scan line where an image of the sectional contour line is present.

The optical displacement sensor of this invention may also include a graphical user interface for allowing a conversation between an operator and the image monitor through a pointing device The optical displacement sensor of this invention may be used for the inspection of industrial products being transported on a production line in a factory. In such an application, it is commonly done to define a target area inside the linearly elongated area on which the slit beam of light is made incident and the inspection or monitoring is concentrated on a specified portion included in this target area. The products being transported on a conveyor are sometimes displaced on the conveyor in the direction perpendicular to the direction of transportation or in the direction of height. If the target area is fixed in such a situation, specified portions of target objects may not be properly inspected. It is preferable, therefore, to provide tracking control means for changing the target position of measurement according to relative motion of the target object.

BRIEF DESCRIPTION OF THE DRAWINGS

FIGS. 11A, 11B and 11C show different ways of updating data contents in the line data register.

FIGS. 36A, 36B, 37A, 37B and 37C are diagrams for explaining the process of FIG. 35.

DETAILED DESCRIPTION OF THE INVENTION

Figure 1:
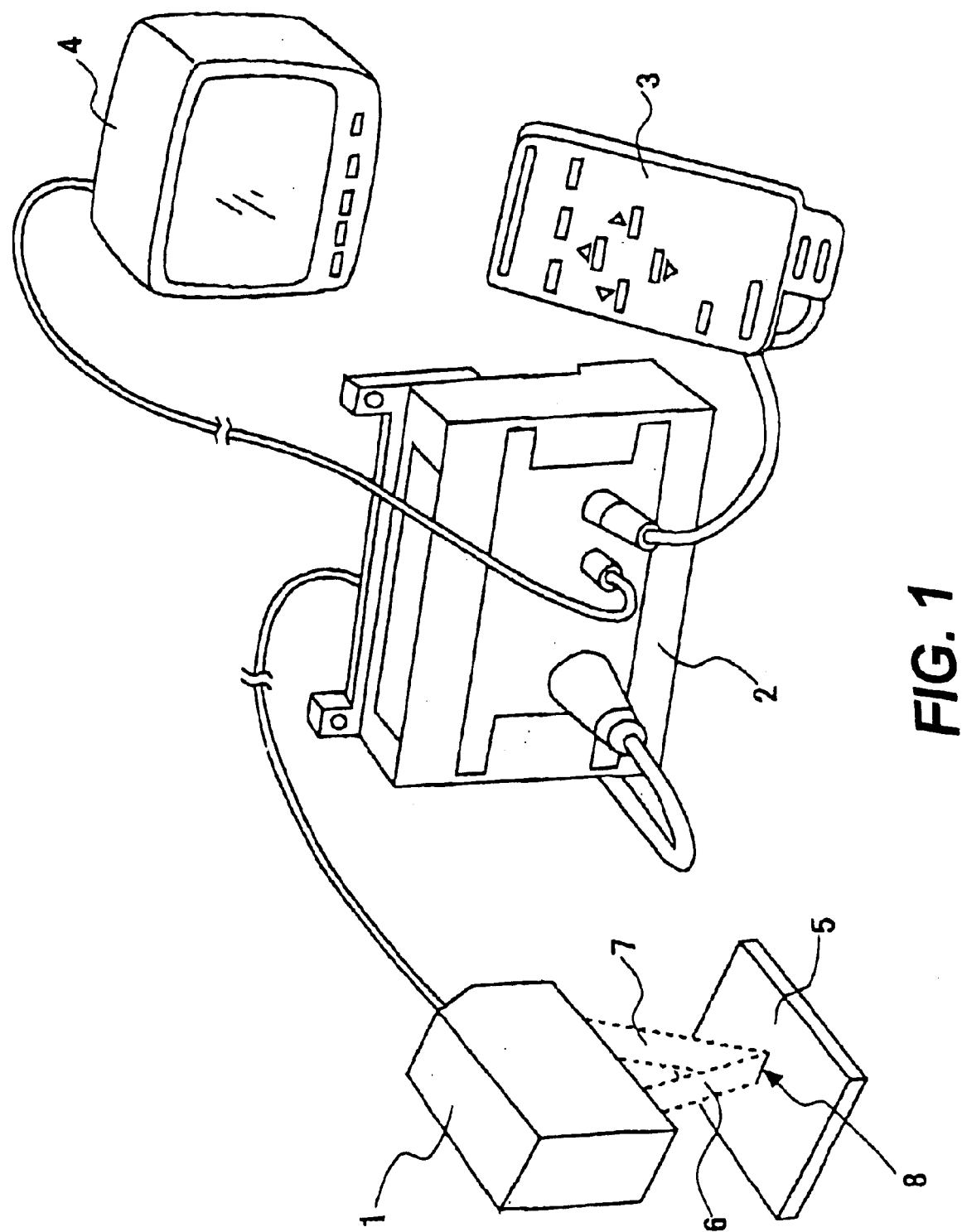
FIG. 1 is an external view of the whole of a displacement sensor system embodying this invention.

The invention is described next by way of an example. FIG. 1 shows a displacement sensor system embodying this invention, including a sensor head unit 1, a signal processor unit 2 for processing image signals obtained from this sensor head unit 1, a hand-held console unit 3 for giving various operational commands to the signal processor unit 2 and an image monitor 4 for displaying results of measurement obtained by the signal processor unit 2 as well as various operational instructions.

As will be explained in detail below, the sensor head unit 1 contains within itself nearly entirely a multi-imaging means provided with (1) a light projecting means for forming a slit beam of light from a light source and projecting it onto a target object at a specified angle, (2) an imaging means for obtaining an image of a sectional contour line of the target object by an optically sectioning plane by using a two-dimensional image taking element from a different angle to photograph the position of incidence of the slit beam on the target object, and (3) a scanning means for scanning the brightness (or clearness) of the image by varying the value of at least one of parameters defining the conditions of image taking and affecting the brightness of the sectional contour line in the image obtained by the imaging means.

The signal processor unit 2 includes (1) an image synthesizing means for extracting from each of specified area segments an image segment satisfying a specified brightness condition and obtaining a synthesized image including a series of images of a sectional contour line by gathering such image segments and (2) a measuring means for carrying out a specified measurement process on the series of partial images of the sectional contour line obtained by the image synthesizing means and thereby generating a measured value and/or a judgment value.

Thus, the sensor head unit 1 serves to irradiate a target object 5 with a slit beam of light 6 and to receive its reflected light 7 with a CCD image sensor (which is a two-dimensional image taking element) thereby generating and outputting an imaging signal indicative of the surface displacements of the target object 5. Numeral 8 in FIG. 1 indicates a line shaped light image (as a bright straight line segment) produced on the surface of the target object 5.

Figure 2B:
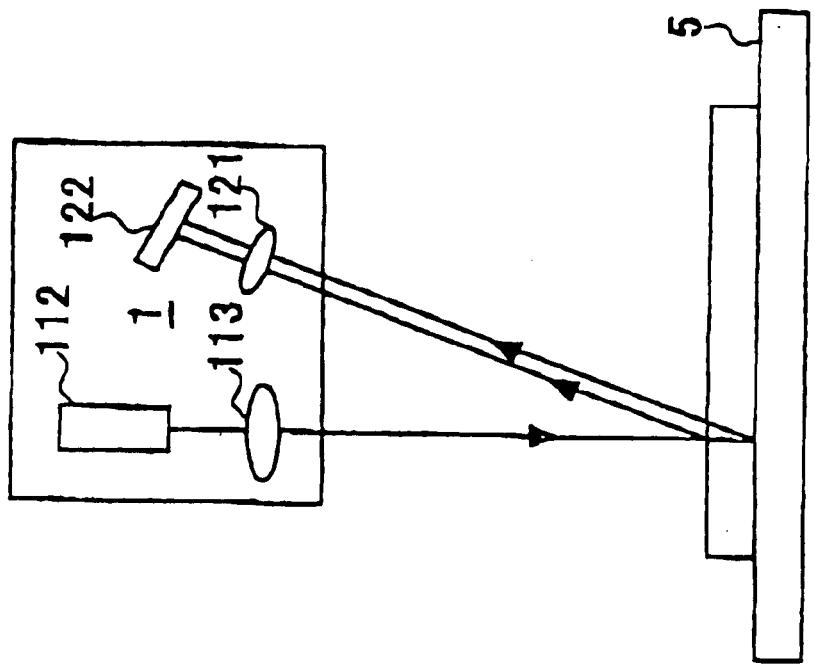
FIG. 2A is a front view and FIG. 2B is a side view of the sensor head unit of FIG. 1 for showing its optical system and its relationship with a target object.
Figure 2A:
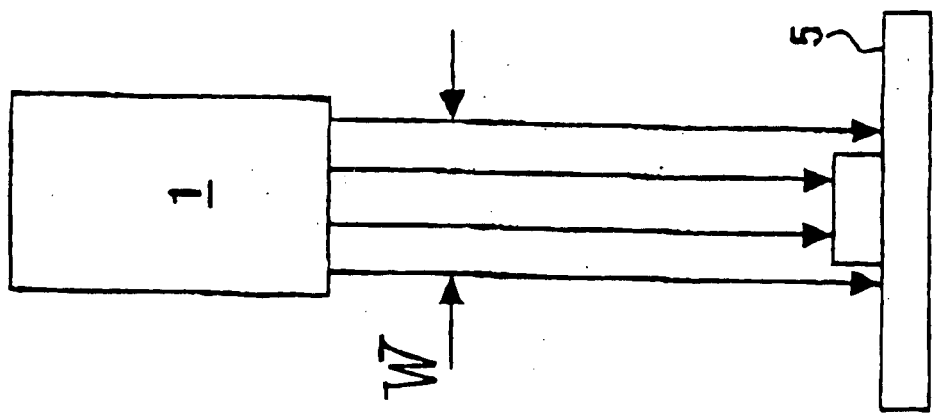

FIG. 2 (consisting of FIGS. 2A and 2B) shows the optical system of the sensor head unit 1 and its relationship with the target unit 5. As shown in FIG. 2B, the sensor head unit 1 contains within itself a slit light source 112, a light projecting optical system 113 for generating the slit beam of light 6 by appropriately converging and reforming the light emitted from the slit light source 112 and a light receiving optical system 121 for leading the reflected light 7 of the slit beam 6 to a two-dimensional CCD image sensor 122. As shown in FIG. 2A, the slit light 6 in this example is relatively wide with width W. The target object 5 is therein shown as having a stepwise elevated part with a flat top (hereinafter referred to as a "mesa" 5a) on its upper surface. If the mesa Sa is narrower than W, its height h can be measured immediately without any relative movement between the sensor head unit 1 and the target object 5.

Figure 3:
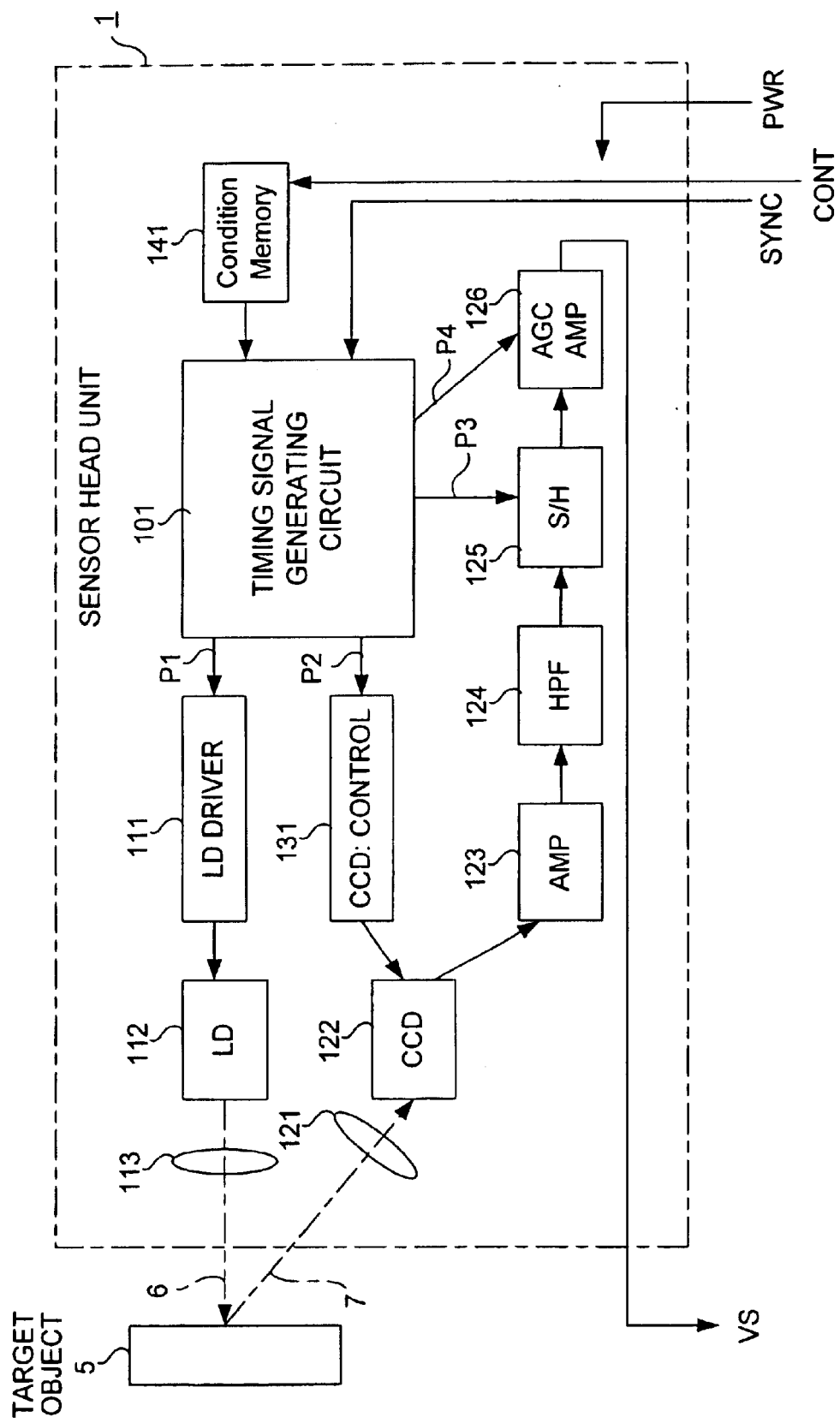
FIG. 3 is a block diagram of the sensor head unit.

FIG. 3 shows the internal circuit structure of the sensor head unit 1. Contained inside the sensor head unit 1 are light emitting elements (including a laser diode (LD) 112, an LD driver circuit 111 and a light transmitting lens 113) for irradiating the target object 5 with the slit beam 6 and light receiving elements (including a light receiving lens 121, a CCD image sensor 122, an amplifier circuit (AMP) 123, a high pass filter (HPF), a sample-and-hold (S/H) circuit 125 and an AGS amplifier circuit (AGS AMP) 126 for receiving the reflected light 7 from the target object 5. As the sensor head unit 1 projects the slit beam 6 straight downward onto the surface of the target object 5, an image of the irradiated surface of the target object 5 including the light image 8 of the slit beam 6 is taken at a different angle by the CCD image sensor 122 to generate an image signal VS.

An LD driving pulse signal P1 for lighting up the laser diode 112 is generated by a timing signal generating circuit 101. In response to the received LD driving pulse signal P1, the LD driver circuit 111 causes the LD 112 to emit light pulses. The timing signal generating circuit 101 serves also to control the peak power of the pulsed laser light through the LD driver circuit 111. The pulsed laser light emitter from the LD 112 is projected onto the target object 5 through the lens 113 as the slit beam 6, causing the line-shaped light image 8 to appear on the surface of the target object.

The duty ratio for the driving of the LD 112 and the peak power of the pulsed laser light are each considered to be one of parameters affecting the brightness (clearness) of the image of the sectional contour line contained in the image produced by the CCD image sensor 122 (hereinafter simply referred to as "CCD").

The reflected light 7 from the target object is made incident through the lens 121 into the CCD 122 which is a two-dimensional image taking element. In summary, the surface of the target object 5 is photographed by the CCD 122 and the photographed image including the light image 8 by the slit beam is converted into an image signal. The positional relationship among the ID 112, the CCD 122, and the light transmitting and receiving lenses 113 and 121 is determined such that the position of the light image 8 of the slit beam 6 on the light receiving surface of the CCD 122 will change, for example, according to the distance between the sensor head unit 1 and the target object 5.

The image signal outputted from the CCD 122 is amplified by the amplifier circuit 123 for each picture element (pixel), and fluctuations of zero-level signals which appear among the pixels are eliminated by the high pass filter 124. The sample-and-hold circuit 125 serves to correct the continuity between the mutually adjacent pairs of pixels such that each pixel signal will correctly represent the quantity of received light. Thereafter, the size of the signal values is appropriately controlled by the AGC amplifier 126 and the signal is transmitted to the signal processor unit 2 as image signal VS. In FIG. 3, SYNC indicates a synchronization signal serving as a standard for the timing signal, and PWR indicates a power source.

By another pulse signal P2 transmitted from the timing signal generating circuit, the driving mode by the CCD 112 including the shutter time is controlled through a CCD control circuit 131. Similarly, the peak hold timing of the sample-and-hold circuit 125, the gain of the AGC amplifier circuit 126 and its switching timing are controlled by pulse signals P3 and P4. The shutter time of the CCD 122 and the gain of the AGC amplifier circuit 126 are parameters defining the image taking conditions affecting the brightness of the image of the sectional contour line contained in the image produced by the CCD 122.

A plurality of patterns of image taking conditions defined by parameters such as the shutter time of the CCD 122, the time of emission from the LD 112, its peak power and the gain of the AGC amplifier circuit 126 that affect the brightness of the image are stored in a condition memory 141 such that various image taking conditions (such as 32 modes from Mode 0 to Mode 31) can be selected by a control signal CONT from the signal processor unit 2. The content of each mode is determined by the combination of one or more of the parameters described above.

Explained more in detail, these modes may be prepared by using only one of the parameters and varying its value in 32 different ways or by using 2 or more parameters and varying each of them. These modes (of image taking conditions) can be automatically switched in response to the control signal CONT. Thus, up to 32 images can be obtained through the CCD 122 while varying (scanning) the brightness of the image by switching the imaging talking conditions. As will be explained more in detail below, these parameters may be varied in uniform units and, if so, these uniform units may be varied according to the target object 5 or the results of obtained image taken of the target object. Similarly, the range within which these parameters are to be varies may be so varied. In other words, the conditions of image taking can be delicately controlled.

Figure 4:
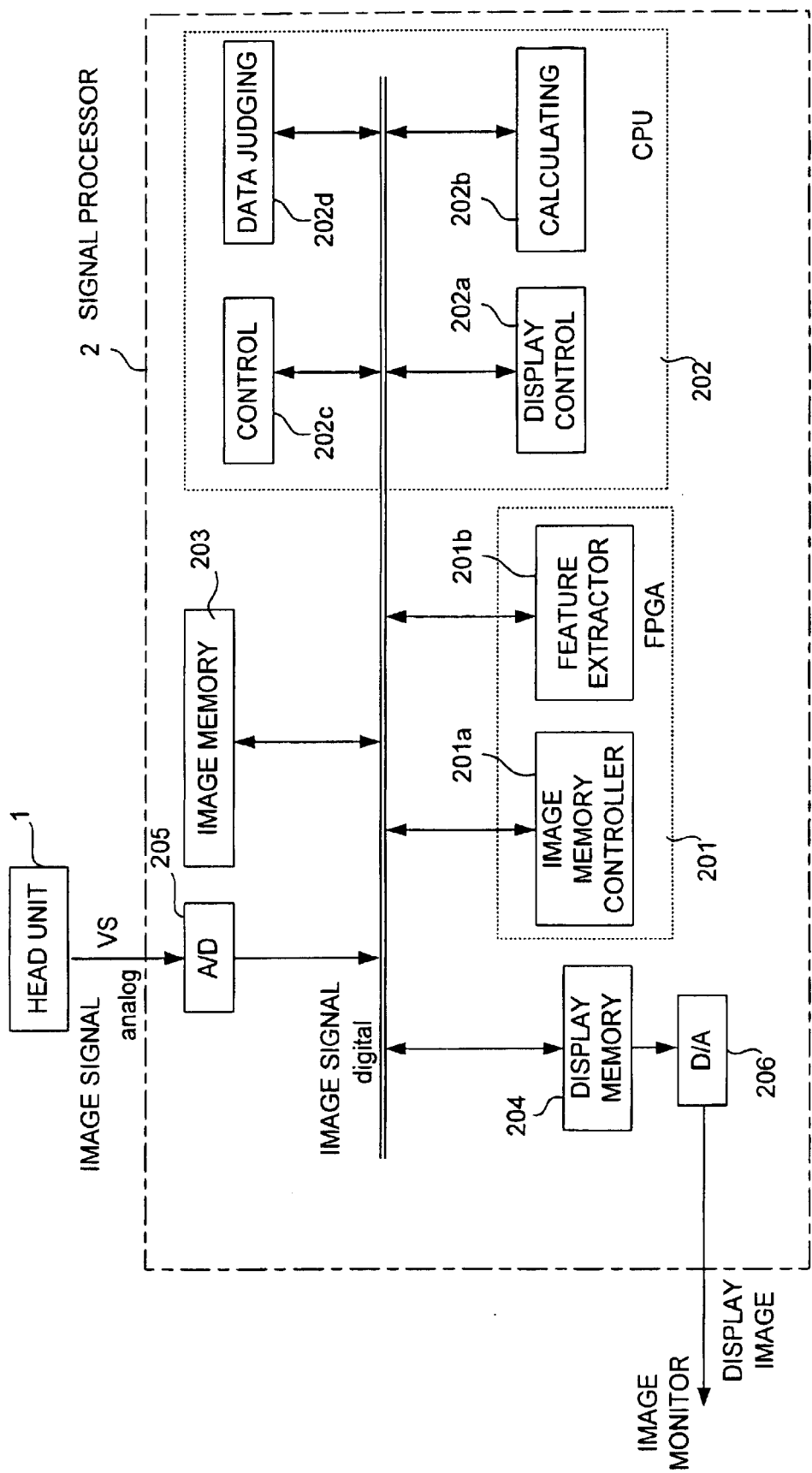
FIG. 4 is a block diagram of the signal processor unit, showing its hardware structure.

The signal processor unit 2 includes, as shown in FIG. 4, a field programmable gate array FPGA 201, a CPU 202, an image memory 203, a display memory 204, an A/D converter 205, a D/A converter 206, an interface (not shown) for driving the sensor head, and an external interface (not shown) for outputting a control signal OUT.

The FPGA 201 includes an image memory controller 201a and a feature extractor 201b. The image memory controller 201a is for controlling the input and output of image data (such as those taken in from the sensor head unit 1 through image signal VS) into and from the image memory 203. It has the function of supporting the feature extractor 201b in carrying out feature extracting calculations, as will be explained below. The image memory controller 201 a is formed with a dedicated hardware circuit. The feature extractor 201b is also formed with its own dedicated hardware circuit and serves to detect a peak pixel out of the image data on each horizontal scan line and the peak density. The image memory controller 201a and the feature extractor 201b will be further explained more in detail below with reference to FIG. 6.

The CPU 202 has a microprocessor as its main component and comprises functionally a display control means 202a, a calculating means 202b, a control means 202c and a data judging (software) means 202d. The display control means 202a is for controlling the input and output of display data into and from the display memory 204. The display data written in the display memory 204 are converted into an analog display image signal by the D/A converter 206 and transmitted to an image monitor (not shown).

The calculating means 202b is for calculating the displacement, which is the original purpose of the sensor, and waits until a synthesized image is completed and then to obtain displacements (such as height, width and length) by calculation. Details of calculations will not be described herein because they are well known as including calculations of (1) the distance between the sensor head unit 1 and the target object 5 along the straight line of transmission of the slit beam, (2) the depth and width of a grooved part on the basis of the image of the sectional contour line from a series of measured values, (3) the average, peak and bottom values of a series of measured values along the straight line of transmission of the slit beam, and (4) a slope angle on the basis of a series of measured values along the straight line of transmission of the slit beam.

The data judging means 202d is for carrying out various data judging, such as whether a calculated value obtained by the calculating means 202b is greater than a standard value or not, or equal to each other. A switching signal is generated and outputted as the result of the judgment. The switching signal thus obtained is transmitted through the external interface 208 to the exterior as a control output OUT.

The A/D converter 205 is for converting the analog image signal VS from the sensor head unit 1 into a digital signal to be transmitted to the signal processor unit 2. The D/A converter 206 is for converting the display data stored in the display memory 204 into an analog signal and to transmit it to the image monitor.

Figure 5:
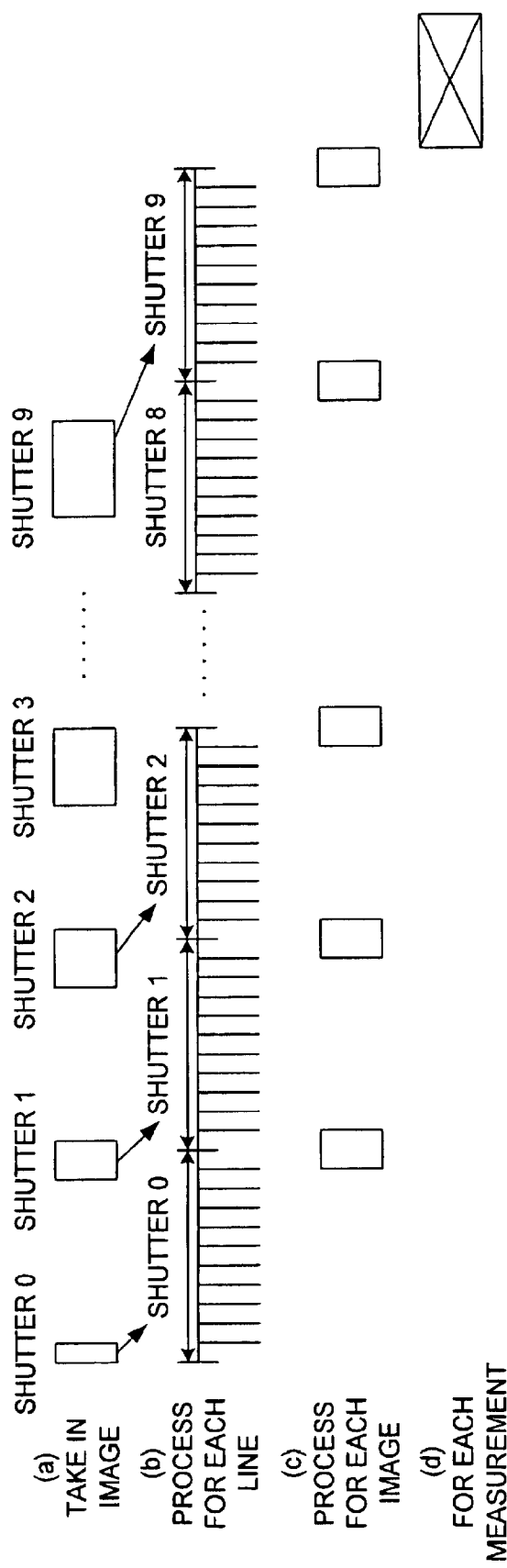
FIG. 5 is a time chart of processes carried out by the sensor.

As explained above, and as schematically illustrated in the timing chart of FIG. 5, the optical displacement sensor of this invention is characterized as scanning the values of at least one of parameters defining image taking conditions affecting the brightness of the image of the sectional contour line contained in the image produced by the CCD 122 in specified units and within a specified range, obtaining a plurality of image data from a two-dimensional image sensor 122, generating a synthesized image by appropriately gathering up images containing clear portions of the sectional contour line from these images and carrying out various processes on the basis of such a synthesized image. FIG. 5 will be explained more in detail below.

Figure 6:
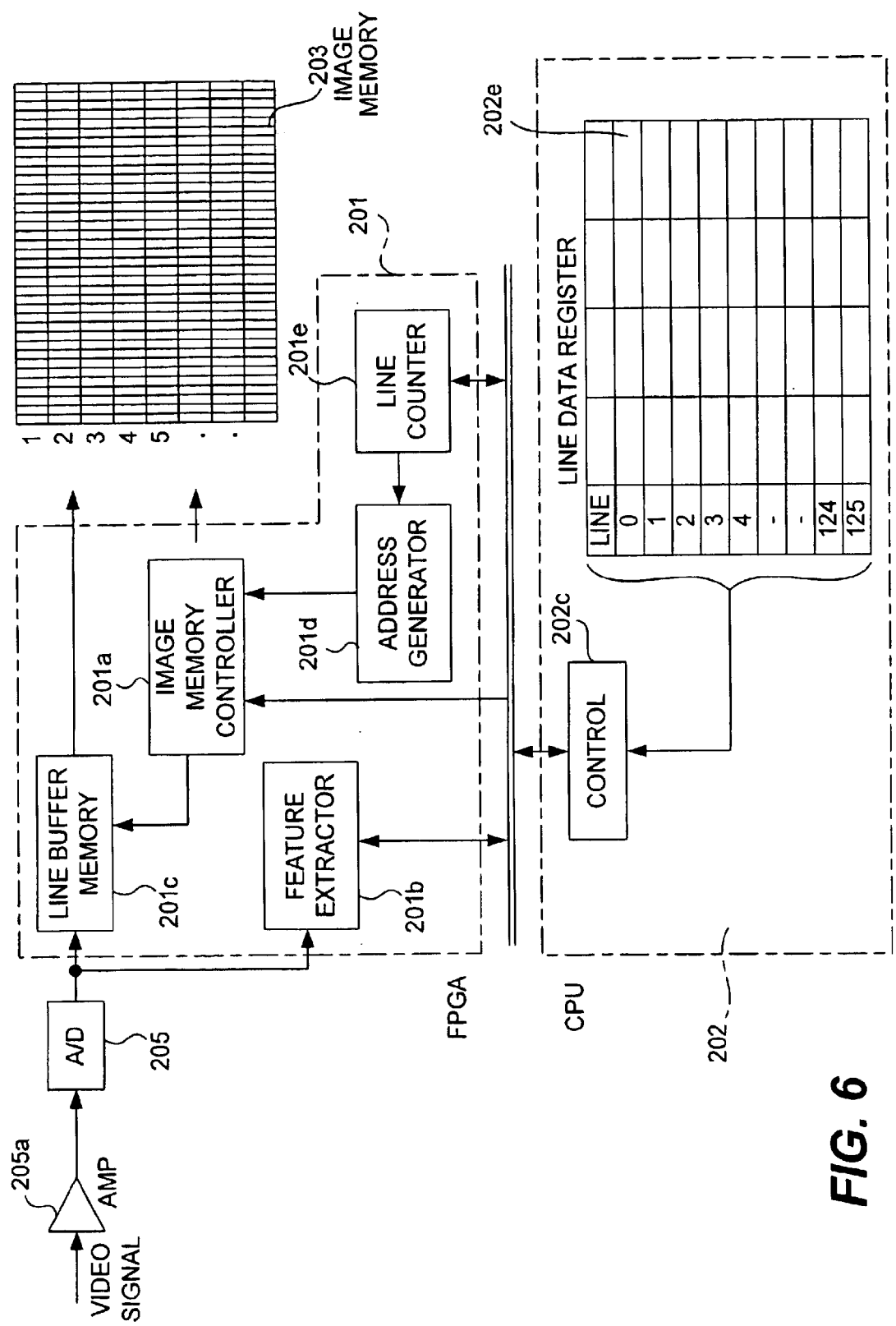
FIG. 6 is a block diagram of the FPGA and the CPU.

FIG. 6 shows the hardware structure necessary for obtaining such a plurality of images and image synthesis, including the aforementioned FPGA 201, the CPU 202 and the image memory 203.

The FPGA 201 includes the image memory controller 201 a, the feature extractor 201b, a line buffer memory 201c, and an address generator 201d and a line counter 201e. The line buffer memory 201c is for temporarily storing one line portion of the image data received from the center head unit 1 through an amplifier (AMP) 205a and the A/D converter 205. The image data for one line thus stored in the line buffer memory 201c become sequentially stored in individual line areas of the image memory 203 by the operations of the image memory controller 201a, the address generator 201d and the line counter 201e. The line counter 201e is increased by +1 each time image data for one line are stored, and the address in the image memory 203 is generated by the address generator 201d according to the counter data of the line counter 201e. The image memory controller 201a serves to transfer the image data for one line stored in the line buffer memory 201c into the line area specified by the address generated by the address generator 201d.

In this example, the volume of the image memory 203 is sufficiently large to store image data for 126 lines. Correspondingly, the field of vision of the image sensor 122 is set to be 126 lines. Such an image sensor having an narrowly elongated field of vision can be produced inexpensively from a commercially available CCD for a still camera or a video camera by masking the areas as "optical black", leaving a portion having 126 lines.

The feature extractor 201b is for determining the peak position of the image data for one line (the position of the pixel with peak brightness) and the height of the target object calculated from the peak position, as these data for one line are transferred from the sensor head unit and stored in the line buffer memory 201c. In other words, with a displacement sensor of this type using the optical sectioning method, the direction of height of a target object and the horizontal scan line direction of the two-dimensional image sensor correspond to each other, and the direction of the sectioning line of the slit beam is perpendicular to the horizontal scan line direction of the image sensor. Thus, the height of the target object can be obtained by measuring the position of pixel on the line for each set of line data.

The CPU 202 includes the control means 202c and a line data register 202e. The control means 202c serves to control the input and output of various data into and from the line data register 202e. In the line data register 202e there are 126 memory areas 0–125 and the memory areas for each line include the following four areas; a finalization flag area, a peak value area, a peak position area and an image taking condition area (or a "mode area" for short).

The finalization flag area is used for indicating whether the data on the corresponding line in the image memory 203 and in the line data register 202e are already "finalized" or not (the "corresponding line" in the above meaning the line being specified by the line counter 201e). The peak value area is used for storing the peak value of the brightness on the corresponding line. The peak position area is used for storing the peak position determined by the feature extractor 201b. The mode area is for storing the image taking conditions (identified by a mode number assigned to each set of conditions) which were used for taking images during the course of processes until the synthesized image is completed, as will be explained more in detail below. After a synthesized image has been determined, this area is used to store the image taking conditions used for taking images for this determined line.

The operations of the hardware explained above with reference to FIG. 6 are explained next by way of the flowcharts of FIGS. 7–11.

In the initialization step 701, the mode number M (meaning the set of image taking conditions) is initialized. A; explained briefly, there are 32 modes in this example. Initialization of the mode means selecting one (M=0) of the 32 prepared modes). Next, a "first time flag" is set (Step 702). When image data for a plurality of images are continuously taken in from the CCD image sensor 122, the first time flag serves to indicate that this is the first batch of data being taken in.

Figure 9:
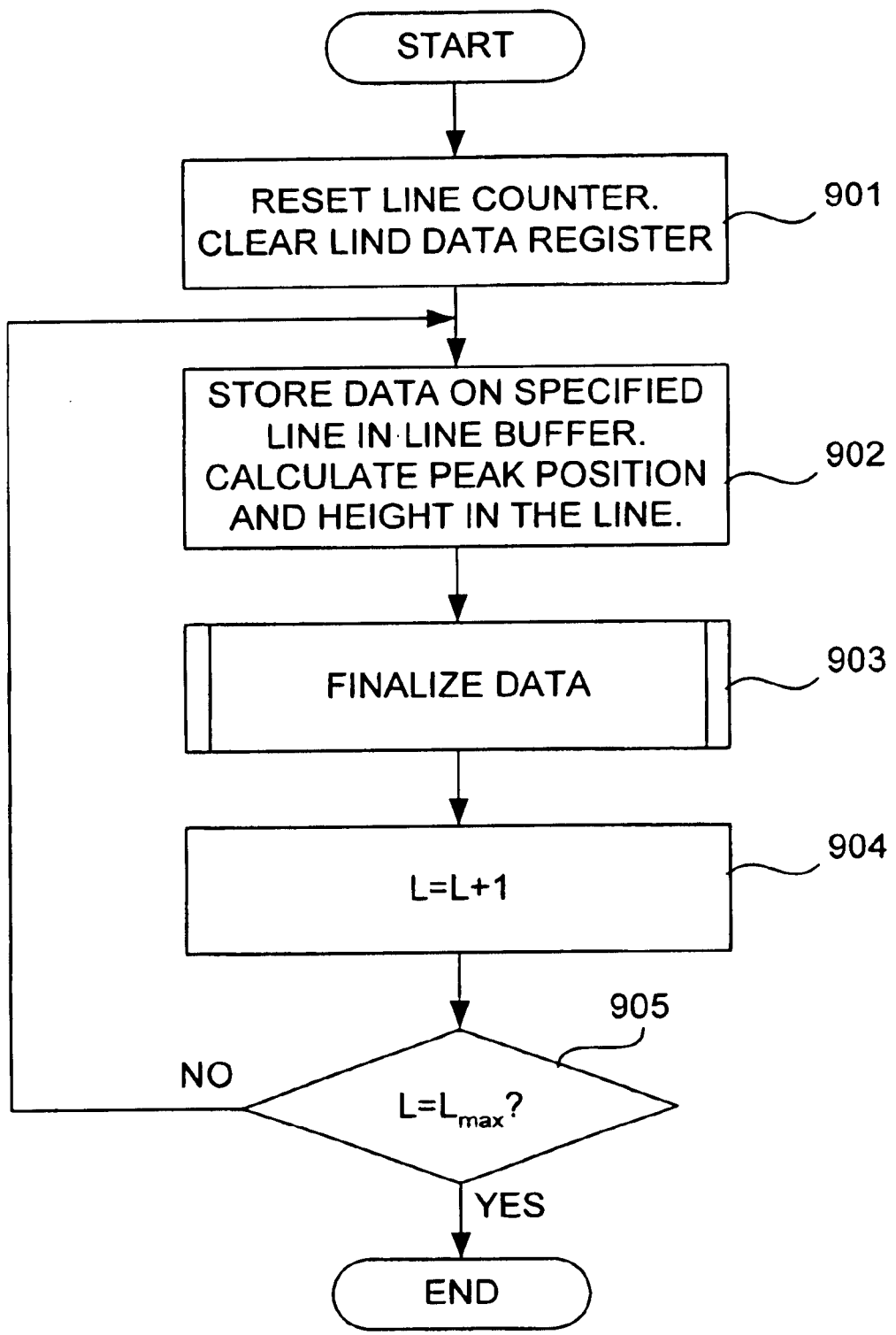
FIG. 9 shows a flowchart for the process for each line.

After these initialization steps 701 and 702 are finished, a command is outputted for taking in video signals for one image screen outputted from the CCD image sensor 122 through the amplifier 205a and the A/D converter 205 (Step 703). Next, a processing for each line is carried out (Step 704) as shown in FIG. 9 more in detail.

In this step (Step 704 of FIG. 7), the line counter (L) is reset, the flag, the peak value and the peak position are cleared in the line data register (R) and a write-over flag is reset as initialization (Step 901). In the above, the line counter (L) is for specifying a line in the image memory 203 and the line data register 202e, and the line data register 202e is for storing a finalization flag, the peak value, the peak position and the image taking condition (mode) for the 126 lines 1–125, as explained above. The finalization flag is for indicating that the data on the corresponding line in the line data register and the image data on the corresponding line in the image memory 203 have been finalized. The write-over flag is for indicating whether or not it is allowed to write over on the corresponding line in the image memory 203 and the line data register 202e.

After the initialization, the data on the line specified by the line counter from the A/D converter 205 are stored in the line buffer memory 201c from the beginning to the end of the line, and the peak position and the peak height in the line are calculated (Step 902). Next, a finalization process is carried out (Step 903). Thereafter, the number of the line counter L is incremented by +1 (Step 903) to repeat Steps 902 and 903 until the value of the line counter reaches $L_{max}$ (YES in Step 905) and the processing for each line (Step 704) is completed.

Figure 10:
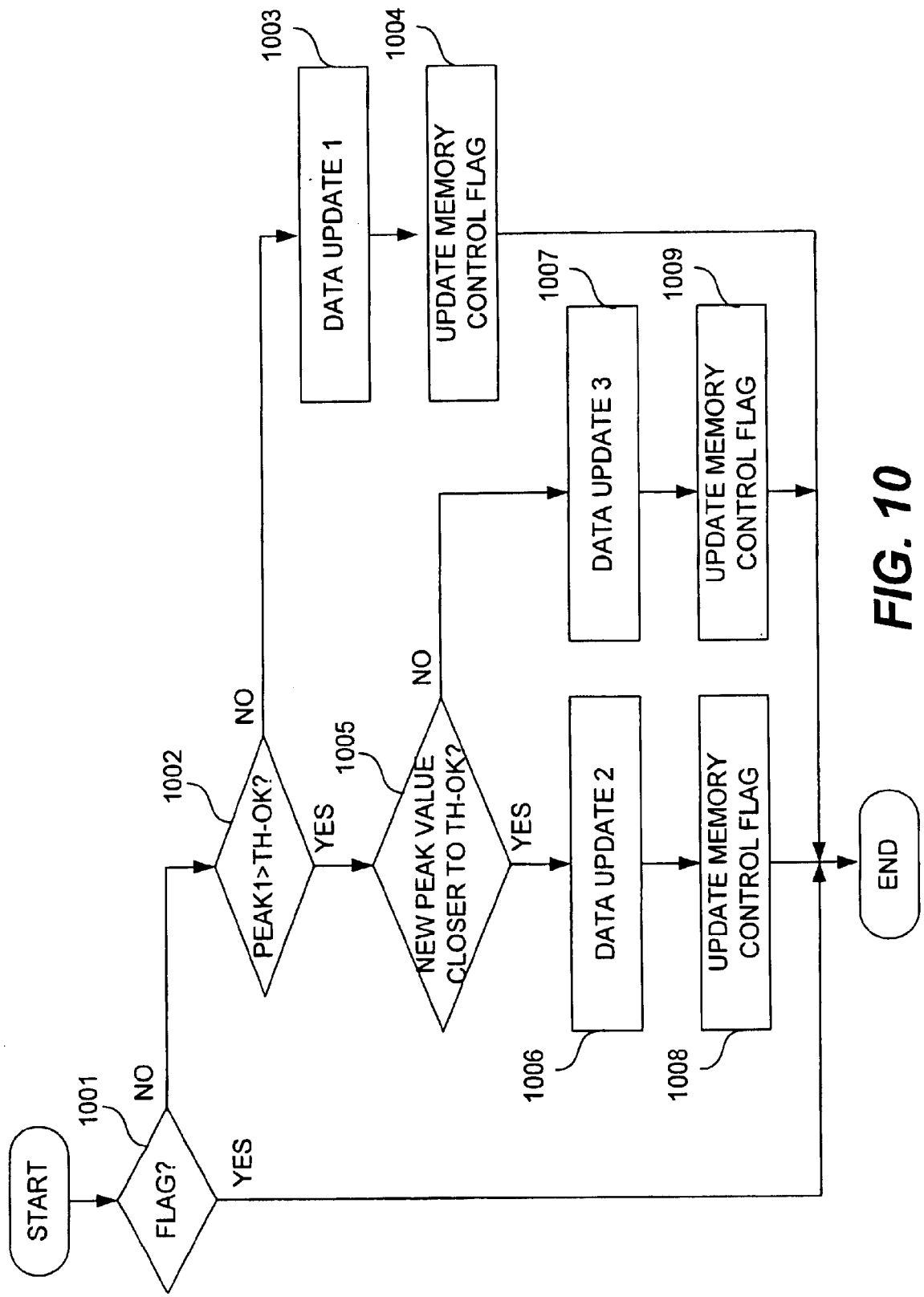
FIG. 10 shows a flowchart for the data finalization process.

FIGS. 10 and 11 show the data finalization process to be carried out subsequently. First, the finalization flag is consulted. If the flag shows that the data are finalized (YES in Step 1001), the program has nothing more to do. If the data are not finalized (NO in Step 1001), the peak value determined by the feature extractor 201b and a standard value TH-OK preliminarily determined according to an optimum measurement condition are compared (Step 1002). If the peak value is not greater than the standard value (NO in Step 1002), Data Update 1 of the line data register as shown in FIG. 11A is carried out (Step 1003), that is, the flag is set to indicate "not finalized", the peak value and the peak position obtained this time are respectively set as the peak value and the peak position, and the present image taking condition is set as the image taking condition. After the process of Data Update 1 is thus completed, the memory control flag is updated (Step 1004). At this moment, the write-over flag is not updated. In other words, the data in the line data register 202e are updated but the write-over flag remains reset, and it remains allowed to write over in this line.

On the other hand, while the image taking conditions (or modes M) are being changed, if the shutter speed is increased, for example, and the peak value of received light increases and becomes greater than the standard TH-OK (YES in Step 1002), it is examined whether or not the newly obtained peak value is closer to the standard value TH-OK than the value now stored in the line data register 202e (Step 1005). If YES in Step 1005, Data Update 2 shown in FIG. 11B is effected (Step 1006), that is, the flag is set to indicate "finalized", the peak value and the peak position obtained this time are respectively set as the peak value and the peak position, and the present image taking condition (or the current mode) is set as the image taking condition. After the process of Data Update 2 is thus completed, the memory control flag is updated (Step 1008). At this moment, the write-over flag is set, thereby preventing the data in the line data register 202e and the image memory 203 for this line from being written over. In other words, their contents are preserved thereafter.

If the newly obtained peak value is found to be farther away from the standard value TH-OK than the currently stored value (NO in Step 1005), on the other hand, Data Update 2 shown in FIG. 11C is effected (Step 1007), that is, the flag is set to indicate "finalized", the currently stored peak value and peak position are respectively set as the peak value and the peak position, and the image taking condition stored in the register is set as the image taking condition (or the mode). Thus, the contents of the peak value and position are finalized while remaining in the condition not exceeding the standard value TH-OK.

After the process for each line (Step 704 of FIG. 7) is thus completed, processes for each image are carried out (Step 705). The processes to be carried out here for each image include: (1) processes related to image control; (2) process of judging the result of calculation; and (3) other processes on the result of calculation. The processes related to image control include setting conditions for taking in the next image (such as shutter speed and the video signal amplification) and judging whether or not images have been taken in with all image taking conditions. In the process of judging the result of calculation, it is checked whether or not the result of calculation has been finalized regarding all lines. Other processes include calculations in the direction of the lines by carrying out a filtering process on the current image.

Thereafter, the mode M is increased by +1 to repeat Steps 703–705. In each cycle of the repetition, the first time flag is examined to ascertain to be set (Step 707) and the current mode M is registered in the line data register (Step 708). These steps are carried out such that only the image taking conditions (modes) found to be effective in the first cycle are used and the other conditions are skipped. In this manner, the time for taking in images and the time for image synthesis can be reduced.

Figure 7:
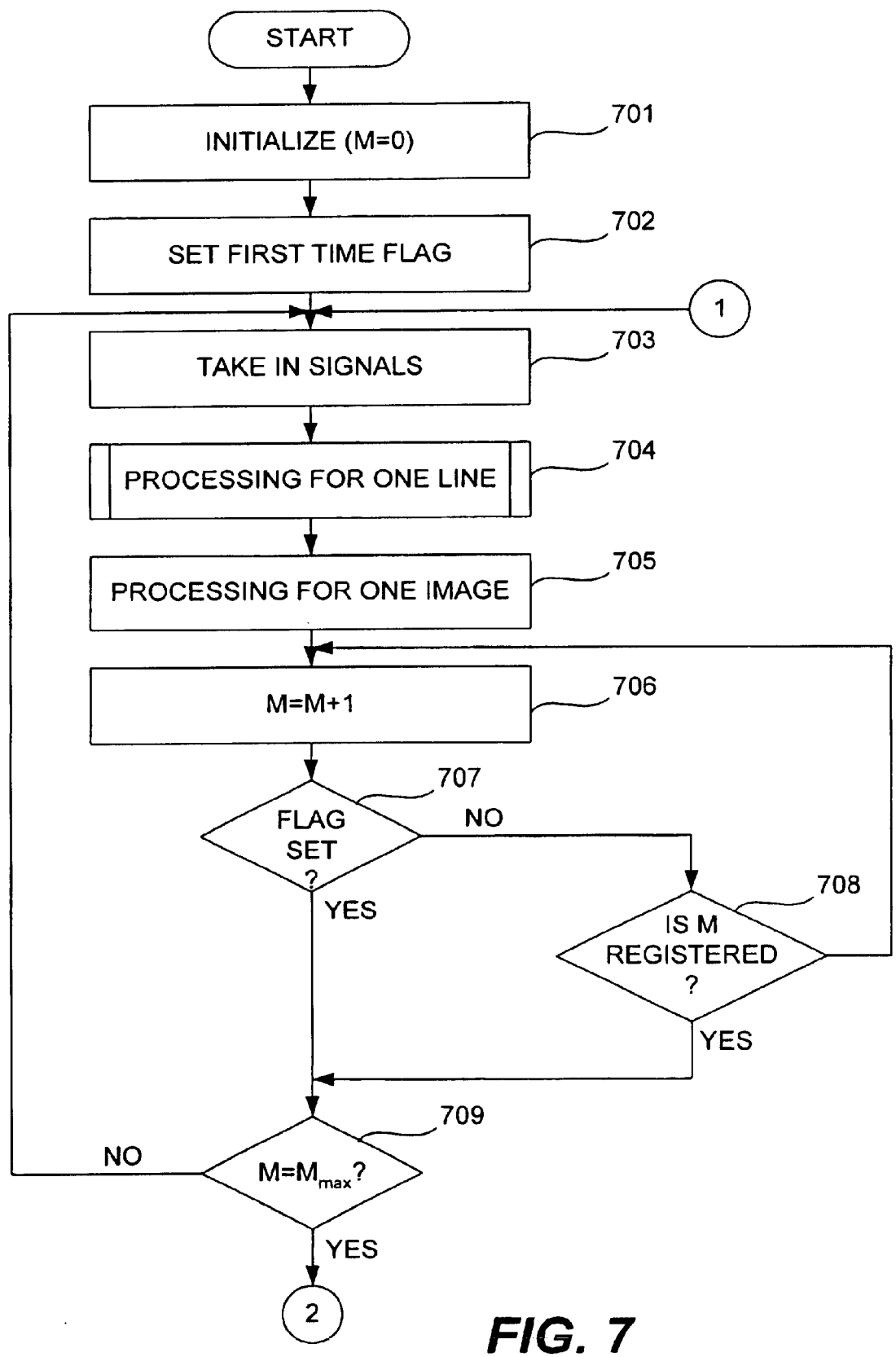
FIGS. 7 and 8 show a flowchart for the process of taking images and synthesizing an image.
Figure 8:
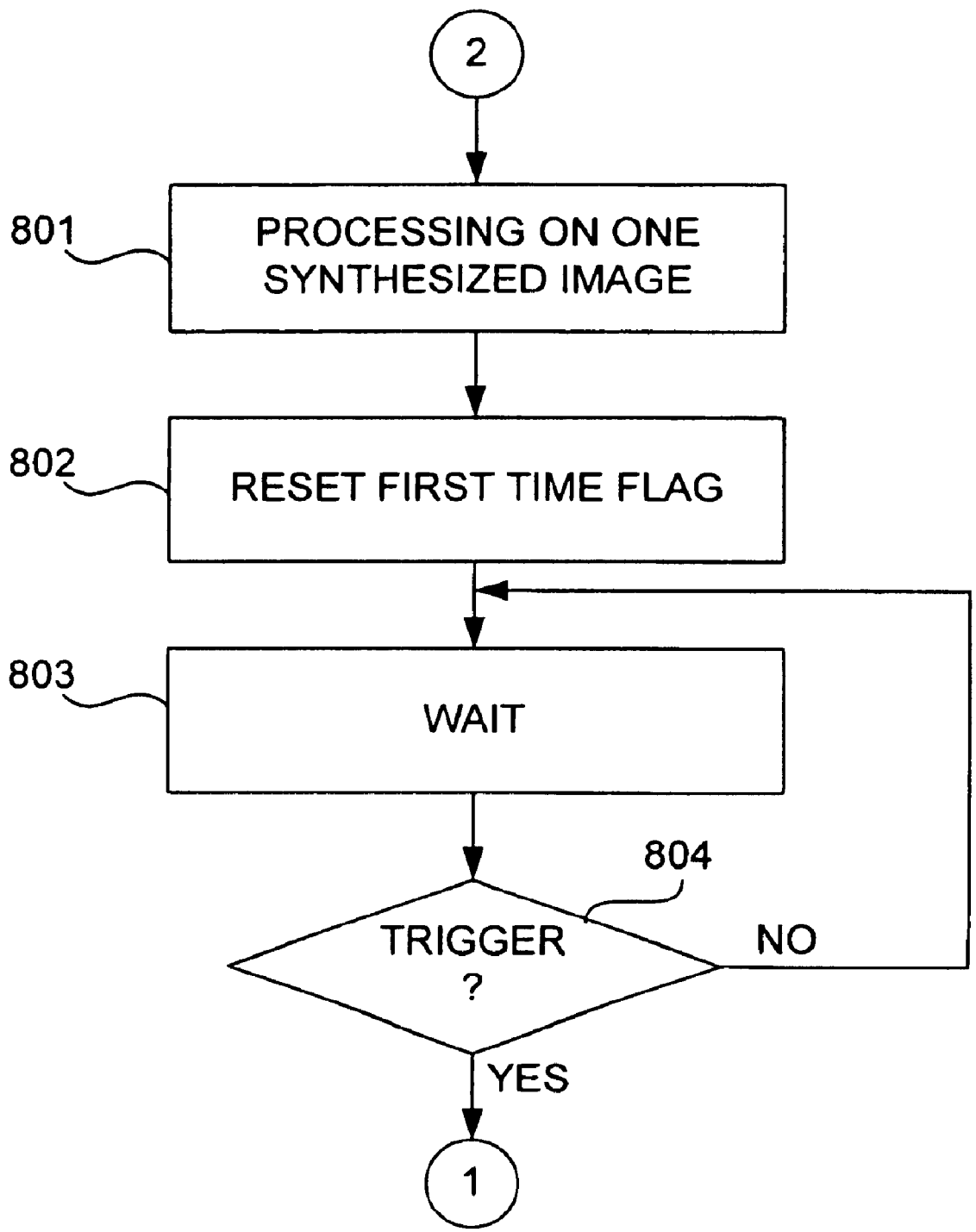

Explained more in detail, during the first cycle of multi-imaging processes and image synthesis, all of the prepared image taking conditions (32 modes) are tried but only those modes found valid in the first cycle are used from the second cycle on. This can be effected because the image taking condition is not cleared in the initialization step (Step 901) but is kept unchanged, and also because Steps 703, 704 and 705 in the flowchart of FIG. 7 are carried out only if the image taking condition (mode M) is registered (Yes in Step 708). If the image taking condition (mode M) is not registered (NO in Step 708), only its updating is effected (Step 706) and Steps 703–705 are skipped.

If mode M reaches a predetermined maximum value $M_{max}$ (Yes in Step 709), a specified calculation process is carried out on the basis of the synthesized image stored in the image memory 203. At the moment when M reaches its maximum value $M_{max}$, the image stored then in the image memory 203 is an assembly of a plurality of images received thus far and each having an image of sectional contour line with a peak value nearly equal to the specified standard value TH-OK. Thus, even if the target object had a surface with variable reflectivity, a sloped surface, a curved surface or a surface with a groove, the synthesized image finally obtained should be an image easy for measurement with uniform clearness and/or brightness because the image taking condition is adjusted continuously.

Processing on one synthesized image (Step 801) may include any of known kinds of calculations such as calculations for the height of a mesa, the width of the target object, a sloped surface and the radius of curvature of a curved target surface.

After Step 801 is completed, the first time flag, explained above in Step 707, is reset (Step S802) and the program waits for the arrival of another command (trigger) to take in a new image (Steps 803 and 804). When such a trigger is received (YES in Step 804), the program returns to Step 703 of FIG. 7 to repeat the steps thereafter, taking in another set of multiple images and carrying out image synthesis.

Next, FIGS. 5 and 12–23 are referenced to explain more in detail the processes of multiple imaging, image synthesis and calculations described above by way of an example. The time chart of FIG. 5 shows (a) the multiple-imaging process; (b) the processing for the individual lines; (c) the processing of each of the multiple images; and (d) the processing for one synthesized image. Let us assume that each image consists of eight lines 0–7.

According to the present invention, as explained above, a plurality of images are taken in while varying (scanning) the image taking conditions (indicated by mode numbers), say, for 32 times from Mode 0 to Mode 31, and after they are synthesized to obtain an optimum image for a measurement, a desired calculation process is carried out on the basis of such an optimum image. In general, these modes are defined by combining a plurality of parameters in different manners. In this example, for the sake of simplicity of explanation, it is assumed that different modes are prepared only by the shutter time for the CCD image sensor. In the example shown in the time chart of FIG. 5, ten modes are prepared, identified as Shutter 0-Shutter 9, each having a different (increased) shutter time (represented by the width of a rectangle on Line (a) of FIG. 5). Line (b) of FIG. 5 shows that the processes for the individual lines (Step 704 of FIG. 7) are carried out between the times at which successive images are taken (Step 703 of FIG. 7). Line (c) of FIG. 5 shows that the process for each of the multiple images taken in is carried out immediately after the processes for each line (Step 704 of FIG. 7). The processing for a synthesized image (Step 801 of FIG. 8) is carried out after the last of the processing for multiple images (Step 705 of FIG. 7) is finished.

FIGS. 12–14 show the relationship between the image input and the image memory content. According to this invention, as explained above, after image data corresponding to one picture are received from the CDD 122, the peak value of the image of the sectional contour line of each line of the image data is compared with a standard value TH-OK which is optimum for the measurement and, if they are close to each other, the image for that one line is finalized as a part of the final (synthesized) image. This process is repeated for each line, and a sheet of synthesized image is finally generated.

Figure 12A:
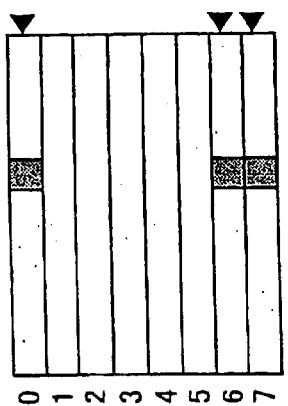
Figure 12B:
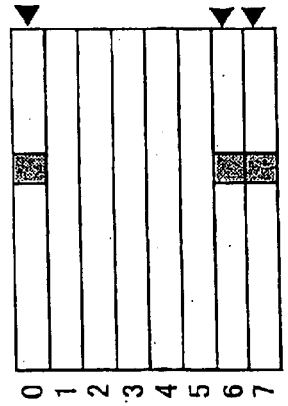
Figure 12C:

FIG. 12A shows the image input when Shutter 1 represents the image taking condition (mode), and FIG. 12B shows how this input is stored in the image memory. FIG. 12C shows the sectional shape of the target object. In other words, under Shutter 1, an image of the sectional contour line is obtained only on lines 0, 6 and 7 and these images are stored on lines 0, 6 and 7 in the image memory. Since they are close to the standard image TH-OK which is optimal for the measurement, they are finalized (as indicated by triangular marks on the right-hand end of FIGS. 12A and 12B.

Figure 13A:
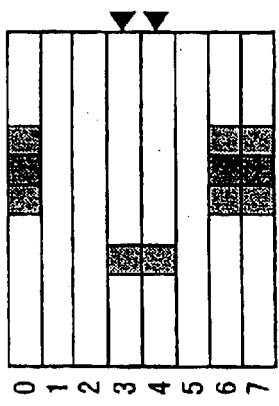
Figure 13B:
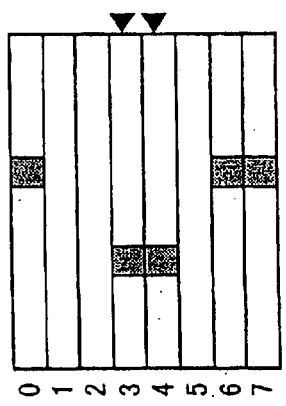
Figure 13C:

Similarly, FIGS. 13A, 13B and 13C show that if the shutter speed is changed such that the image taking condition is indicated by Shutter 3, an image of the sectional contour line is obtained on lines 0, 3, 4, 6 and 7 but that the peaks on lines 0, 6 and 7 exceed a standard value by far, while the peaks on lines 3 and 4 are close to the standard value Th-OK. Thus, the images on lines 3 and 4 are taken into the image memory, stored and finalized (as indicated by triangular marks). Lines 0, 6 and 7 are already finalized and hence are not updated.

Figure 14A:
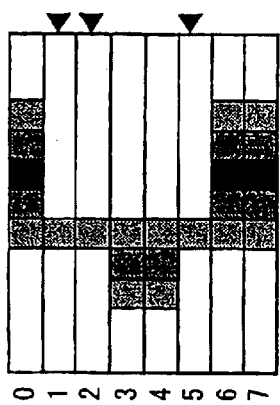
FIGS. 12A, 12B, 12C, 13A, 13B, 13C, 14A, 14B and 14C are drawings for showing the relationship between inputted image and the contents of the image memory.
Figure 14B:
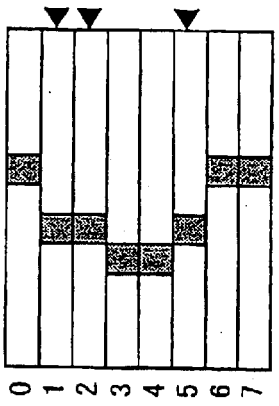
Figure 14C:

FIGS. 14A, 14B and 14C show that under Shutter 8 an image of the sectional contour line is obtained on all lines 0–7 but that the peaks on lines 0, 3, 4, 6 and 7 exceed the standard value by far, while the peaks on lines 1, 2 and 5 are close to the standard value TH-OK. Thus, the images on lines 1, 2 and 5 are taken into the image memory and finalized (as indicated by triangles). Lines 0, 3, 4, 6 and 7 are already finalized and hence are not updated.

Figure 15:
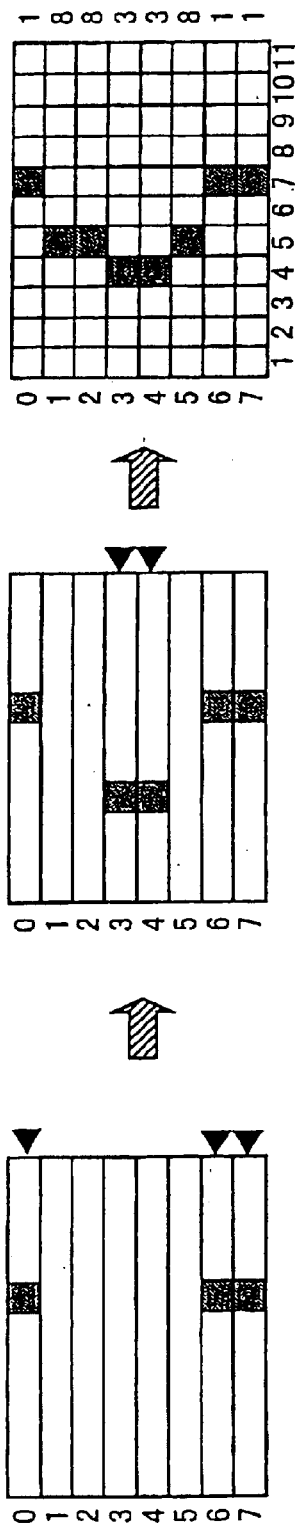
FIG. 15 is a drawing for showing the principle of the teaching process for limiting image taking conditions.

FIG. 15 is referenced next to explain the process of "teaching" for limiting the conditions for receiving light. As explained above with reference to FIG. 7, the image taking conditions (modes) used for obtaining the first synthesized image are kept as "teaching data". In the subsequent processes for multiple-imaging and image synthesis, these teaching data are referenced and those of the modes which have not been used are skipped in order to eliminate waste of time.

FIG. 15 shows for this example that lines 0, 6 and 7 are finalized under Shutter 1, lines 3 and 4 are finalized under Shutter 3 and lines 1, 2 and 5 are finalized under Shutter 8. The image taking condition (mode) under which each line was finalized is shown on the right-hand end of FIG. 15.

This is what is stored in the mode area of the line data register 202e. In other words, the line data register 202e stores "1, 8, 8, 3, 3, 8, 1, 1" in the mode areas for the individual lines. Thus, in the subsequent multi-imaging processes and processes for synthesizing an image, the image taking conditions (modes) other than "1, 8, 8, 3, 3, 8, 1, 1" are skipped. In short, although ten modes were mechanically used, only three modes (Shutters 1, 3 and 8) are used thereafter and still a synthesized image including an image of sectional contour line with appropriate brightness can be obtained.

Figure 16:
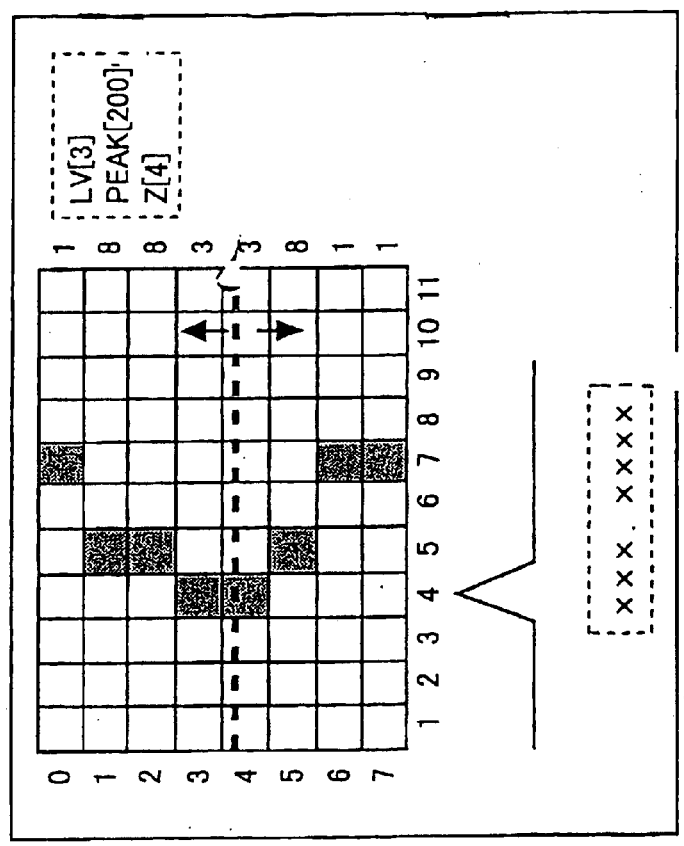
FIG. 16 is an example of display on the monitor.

FIG. 16 shows an example of display which may be made on the image monitor 4 for the example described above. The horizontal line of a main graph indicates the measured values and the vertical axis indicates the line (number) to display one-screen portion of the synthesized image. A broken cursor line is also shown. The user can operate a key on the console unit 3 to move the cursor line vertically. Data related to the line indicated by the cursor are displayed outside the graph area. In the example shown in FIG. 16, the shutter time (LV), the peak value (PEAK) and results of measurement (Z) are displayed on the right-hand side, and the distribution of quantity of light along the horizontal line indicated by the cursor is shown displayed below. Further below, the result of measurement of the entire image is displayed (as xxx.xxxx). Thus, the user can move the cursor up and down to bring the cursor to a line and easily understand the distribution of quantity of light on the specified line, the shutter time, the peak value and the results of measurement. The vertical array of numbers on the right-hand side of the graph each show the shutter time when the image data for that line were finalized.

Figure 17:
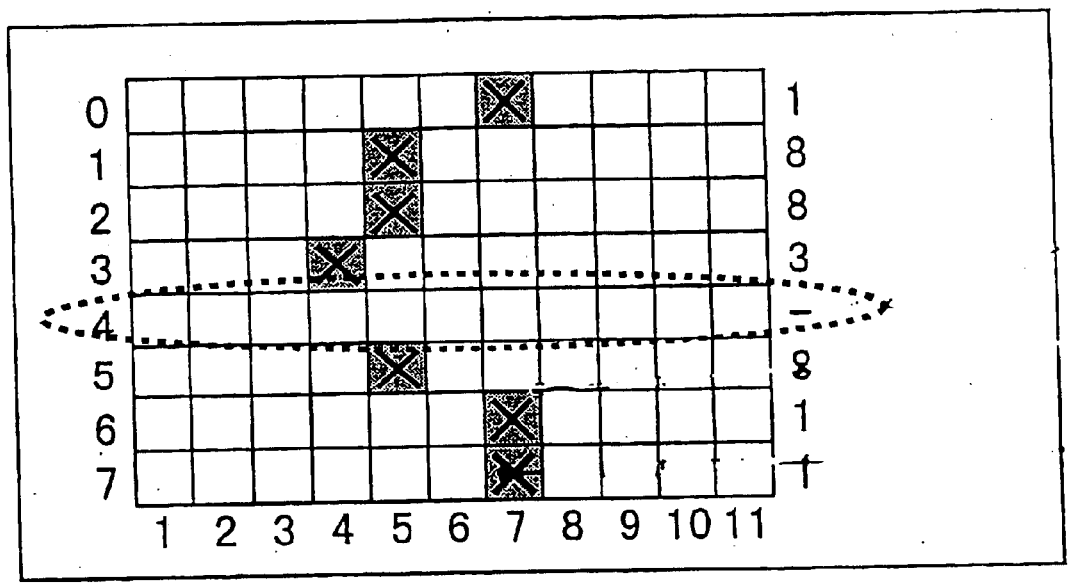
FIGS. 17 and 18 show an example where an acceptable peak value could not be obtained on a line.

FIG. 17 shows a situation where an acceptable peak value could not be obtained on a line after using all of the prepared modes and no image has been registered for the line. If the user is not waned of the occurrence of such a situation, this may result in a synthesized image which is not adequate for the measurement and the user may not be able to ascertain for the cause of such a failure. According to the preferred embodiment shown in FIG. 17, where line 4 has no image of a sectional contour line, a bar symbol "-" is displayed on the right-hand side to indicate that no acceptable peak value could be obtained.

Figure 19:
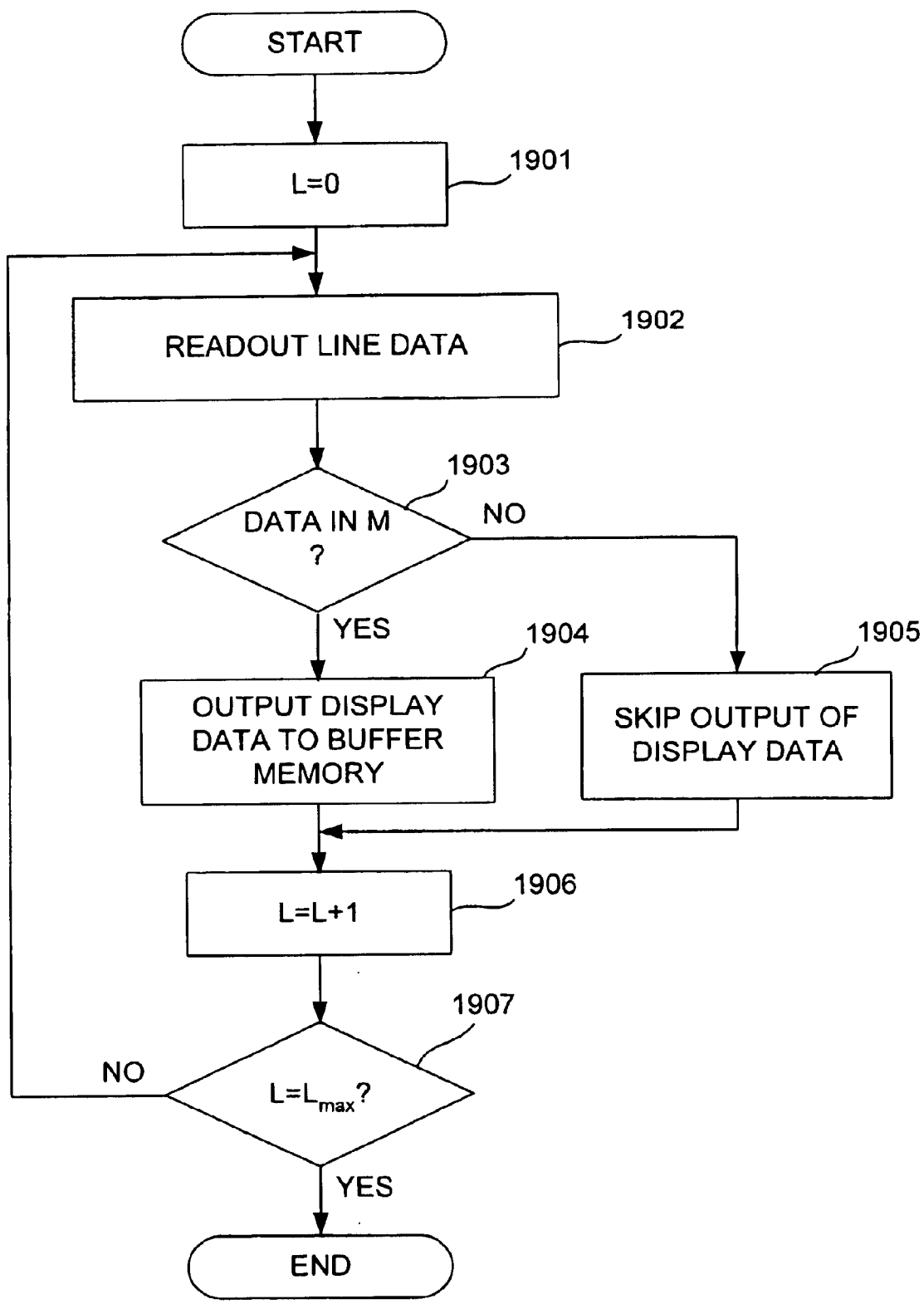
FIGS. 19 and 20 are flowcharts of procedures which may be followed when an acceptable peak value could not be obtained on a line.

FIG. 19 shows a program for making such a display. After the line counter (L) is reset to zero (Step 1901), line data corresponding to the line indicated by the line counter are retrieved (Step 1902) and it is examined if the mode is registered in the mode area M of the retrieved line data (Step 1903). If this mode is present in the mode area M (YES in Step 1903), the image data for the Line are directly outputted to a display buffer (not shown) (Step 1904). If the mode is not present in the mode area M (NO in Step 1903), the image data for the line are skipped and not transmitted to the display buffer (Step 1905). These steps are subsequently repeated by increasing the line counter L by +1 each time (Step 1906) and the process ends when the last line number $L_{max}$ has been reached (YES in Step 1907). As a result, only the finalized image data from the line data are transmitted to the display buffer and the image monitor 4 displays a synthesized image including only the images of sectional contour lines of finalized lines, excluding those of not finalized lines. Thus, the user can readily recognize a defect on the synthesized image.

Figure 18:
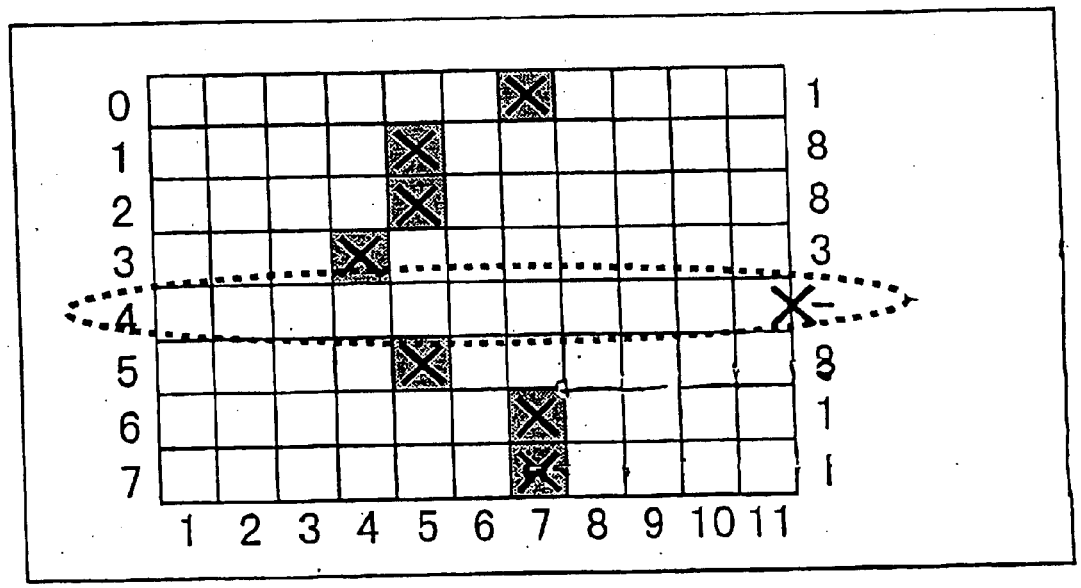
Figure 20:
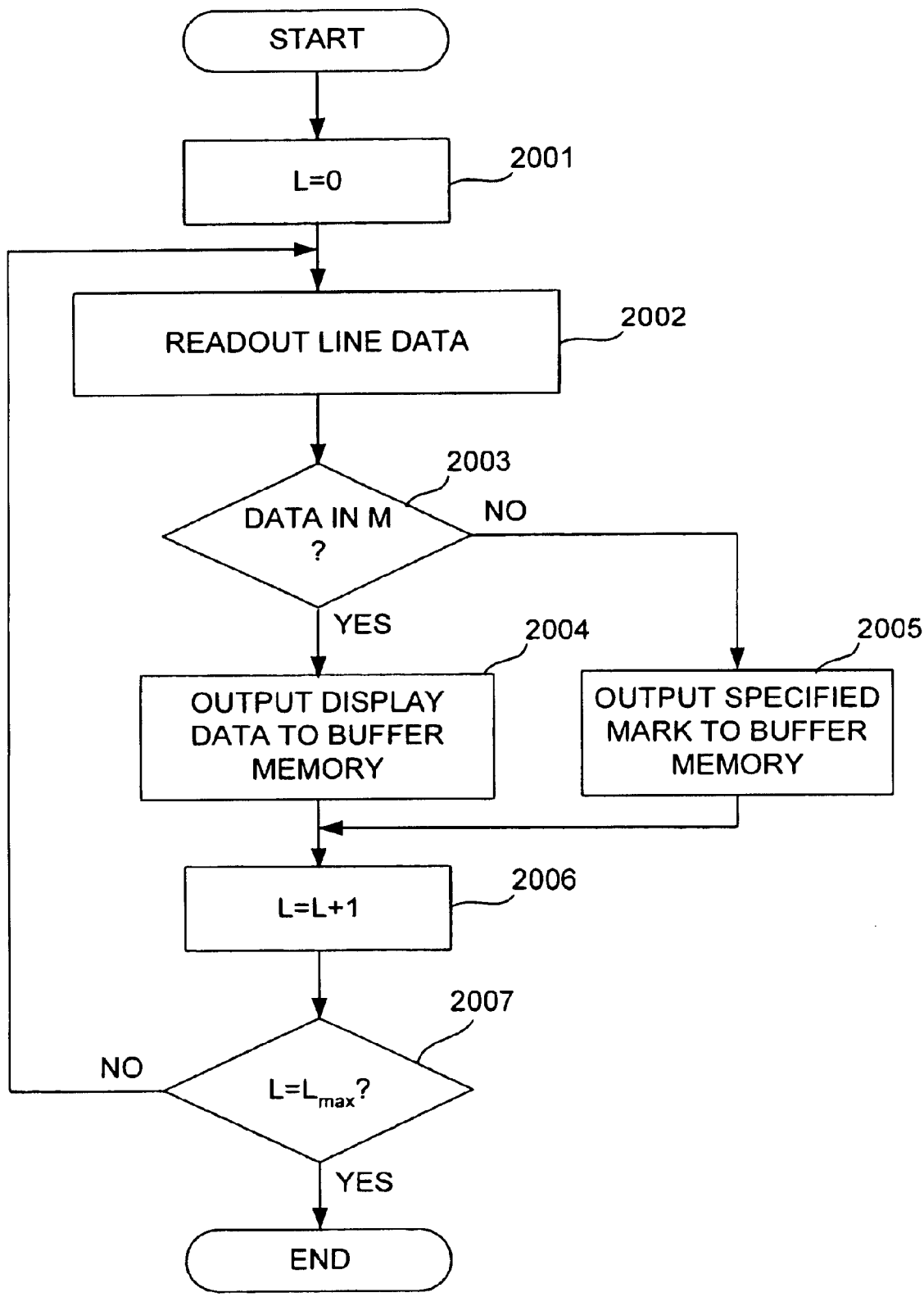

FIG. 18 shows another example for indicating a line on which an acceptable peak value could not be obtained after using all prepared modes. In this example, a specified distinctive mark (shown symbolically by an X in the figure) is displayed on such a line to alert the user. FIG. 20 shows a program for making such a warning display. Steps 2001–2007 in FIG. 20 are the same as Steps 1901–1907 in FIG. 19 except that the specified distinctive mark is outputted in Step 2005.

Figure 21:
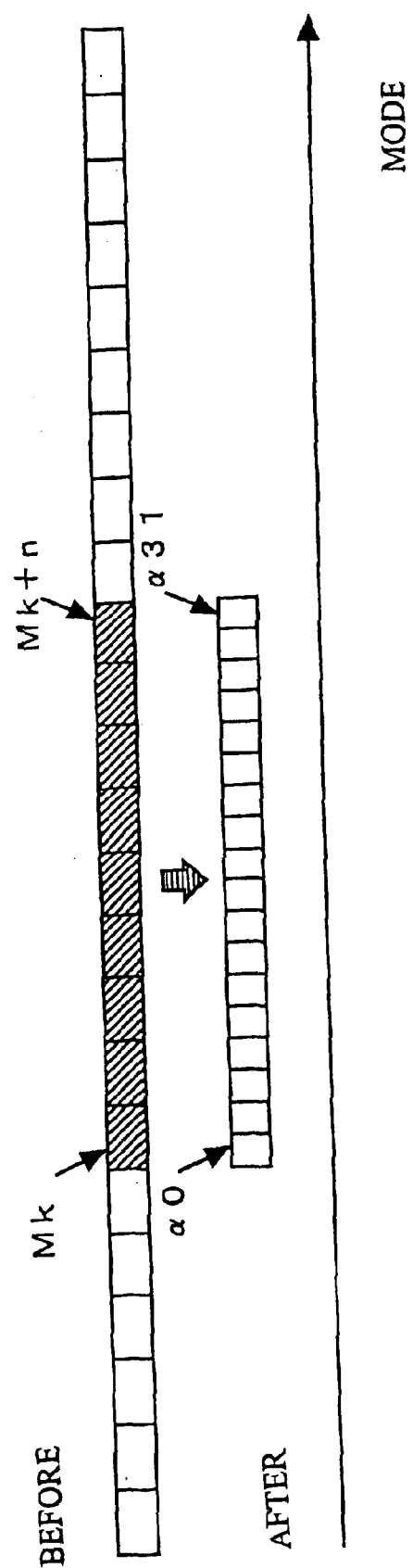
FIG. 21 is a conceptual diagram for showing how modes are changed.
Figures 22, 23A, 23B:
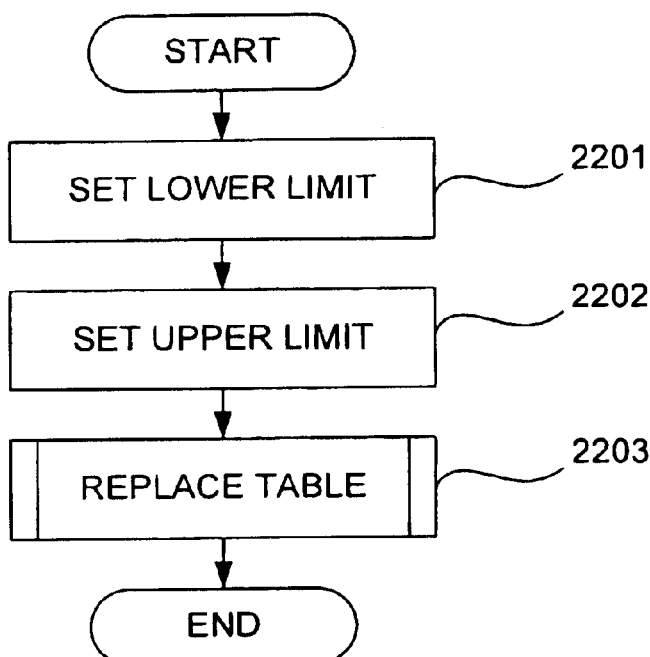
FIG. 22 is a flowchart for changing modes of image taking conditions.
FIGS. 23A and 23B show how a table of image taking modes is rewritten.

Let us assume that only modes $M_k$–$M_{k+n}$ of image taking conditions were used, as shown in FIG. 21, for obtaining the first synthesized image from the first multi-imaging process although the first synthesized image obtained as explained above may not have been an optimum synthesized image in terms of clearness or brightness. According to a routine of this invention for changing modes, as shown in FIG. 22, modes $M_k$ and $M_{k+n}$ are registered as the lower and upper limits (Steps 2201 and 2202) by way of a cursor or a key. As a result, the table of modes is rewritten (Step 2203) to obtain a customized table shown in FIG. 23B to replace the standard table from M0 to M31 as shown in FIG. 23A.

Explained more in detail by way of an example, the standard table defines the 32 shutter speeds (0–31) of the 32 available modes such that they increase sequentially in units of 0.1. Let us further assume that the lower and upper limit values registered by the user were respectively 0.3 and 0.8, as indicated by arrows in FIG. 23A. The aforementioned customized table is, formed by dividing the interval between these lower and upper limits registered by the user into 32 steps to define a new set of shutter times (new modes M'), as shown in FIG. 23B. Thus, the range of modes $M_k$ to $M_{k+n}$ is now more finely divided into 32 new stages $\alpha 0$–$\alpha 31$, as shown in FIG. 21. In the subsequent multi-imaging and image synthesizing processes, the image taking conditions are changed in these newly defined more finely increasing stages. Thus, if a synthesized image is not accurate enough, whether or not it is the first or a later obtained image, the process shown in FIG. 22 can be followed to vary the image taking conditions more finely.

Figure 24A:
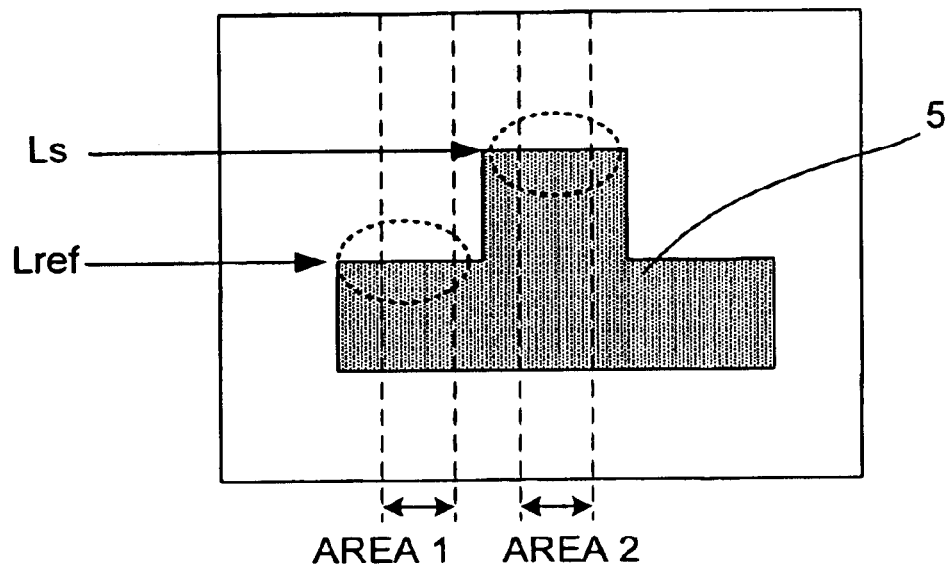
FIGS. 24A and 24B show the effect of a horizontal displacement of the target object.
Figure 24B:
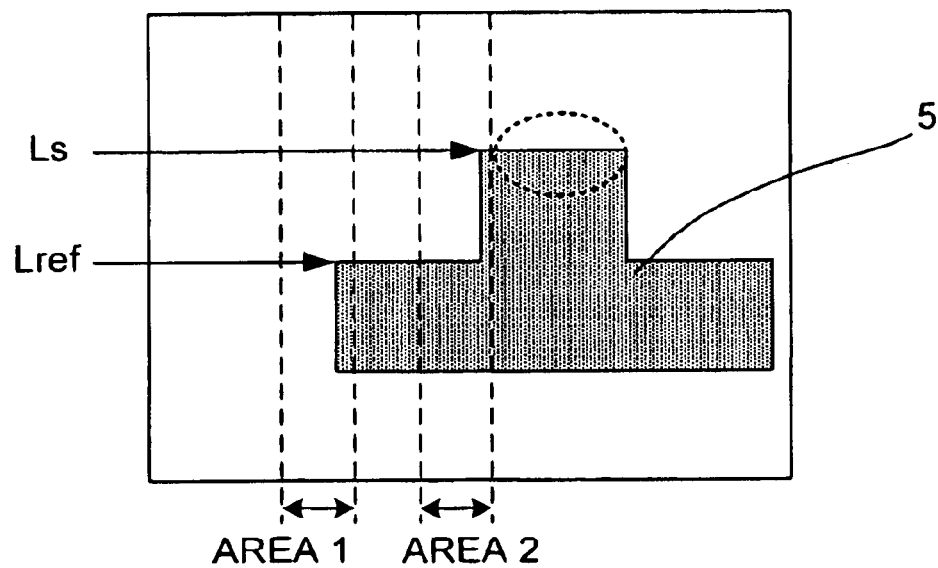

One of the causes for the occurrence of a synthesized image having a line or lines where no peak value can be obtained is that the target object 5 becomes displaced horizontally during the measurement. FIGS. 24A and 24B illustrate a situation of this kind in the case of a target object with a mesa of which the height is intended to be measured. Suppose, as shown in FIG. 24A, Area 1 of a specified width has been set where a reference surface $L_{ref}$ is expected and Area 2 of another specified width has been set where a target surface $L_s$ is expected, both within the field of vision of a two-dimensional image taking element. The height of the mesa is to be obtained by measuring the average heights of Areas 1 and 2 and taking their difference.

If the target object has undergone a horizontal displacement after Areas 1 and 2 were defined as explained above such that Area 1 comes to miss the reference surface $L_{ref}$ and/or Area 2 comes to miss the target surface Ls as shown in FIG. 24B. The difference therebetween cannot be expected any longer to represent the height of the mesa. Such a horizontal displacement may be expected while a target object is being transported on a conveyor when it is shoved in a direction perpendicular to the direction of transportation or when the direction of projection of the slit beam becomes erroneously displaced in the direction of the slit although the target object is properly positioned on the conveyor.

Figure 25:
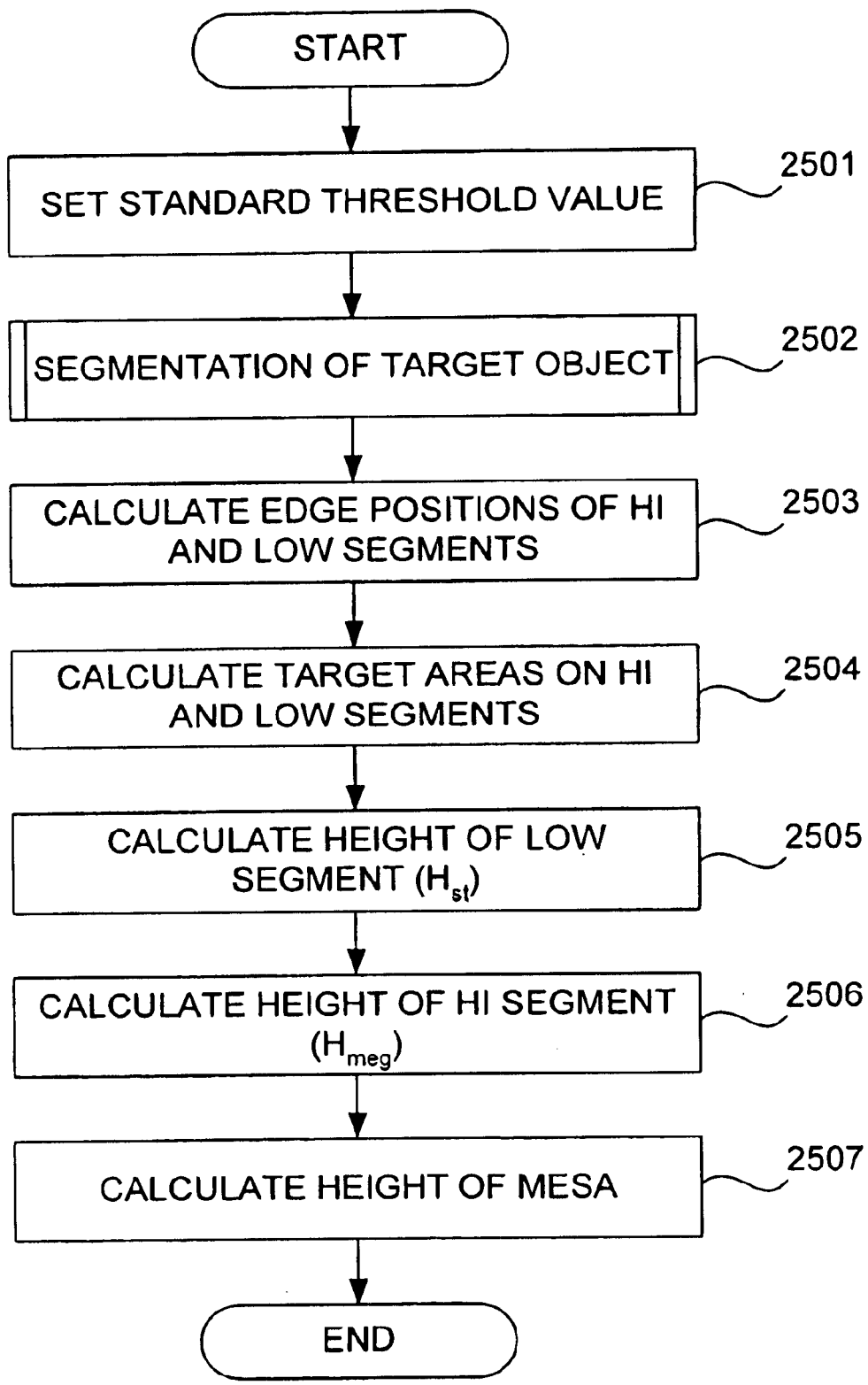
FIG. 25 is a flowchart of a process against a horizontal displacement of the target object.
Figure 29:
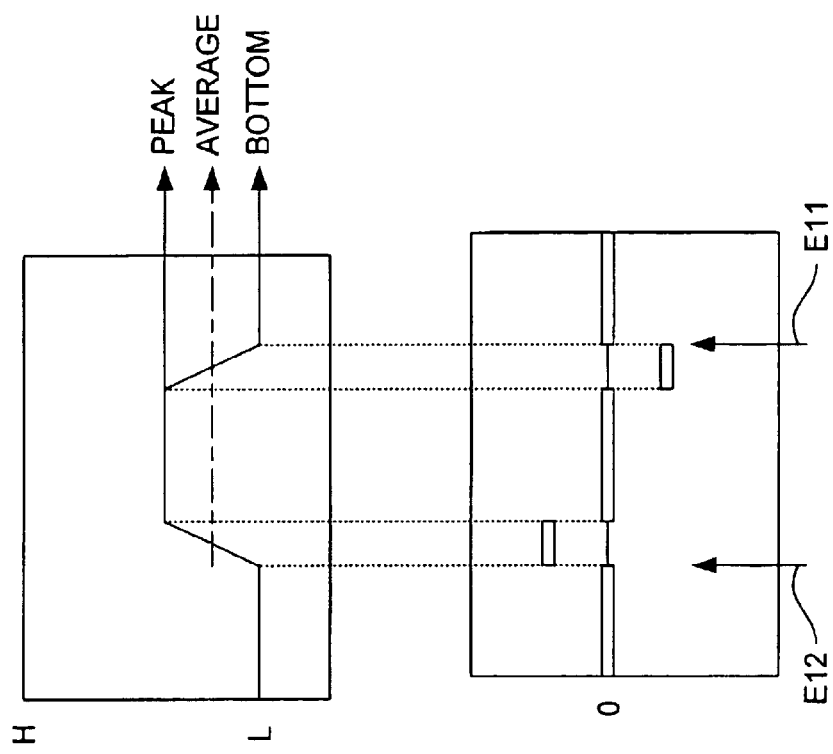
FIG. 29 shows how a standard threshold value is calculated by differentiation.

FIG. 25 shows a measure that may be taken according to this invention for such a situation. This routine starts by setting a standard threshold value (Step 2501) by a differentiation method of a known kind. Suppose a trapezoidally shaped sectional contour line as shown in FIG. 29A appeared in the filed of vision of the CCD image sensor. It is then possible to determine edge positions E11 and E12 representing the right-hand and left-hand end positions of the trapezoidal form by a differentiating it, as shown in FIG. 29B. Once the edge positions E11 and E12 are thus determined, either of the following formulas may be used to define the threshold value:

Threshold=(Bottom)+α{(Peak)−(Bottom)}, or

Threshold=(Average)+β where $0<\alpha<1$ and β is an appropriately selected constant.

Figure 26:
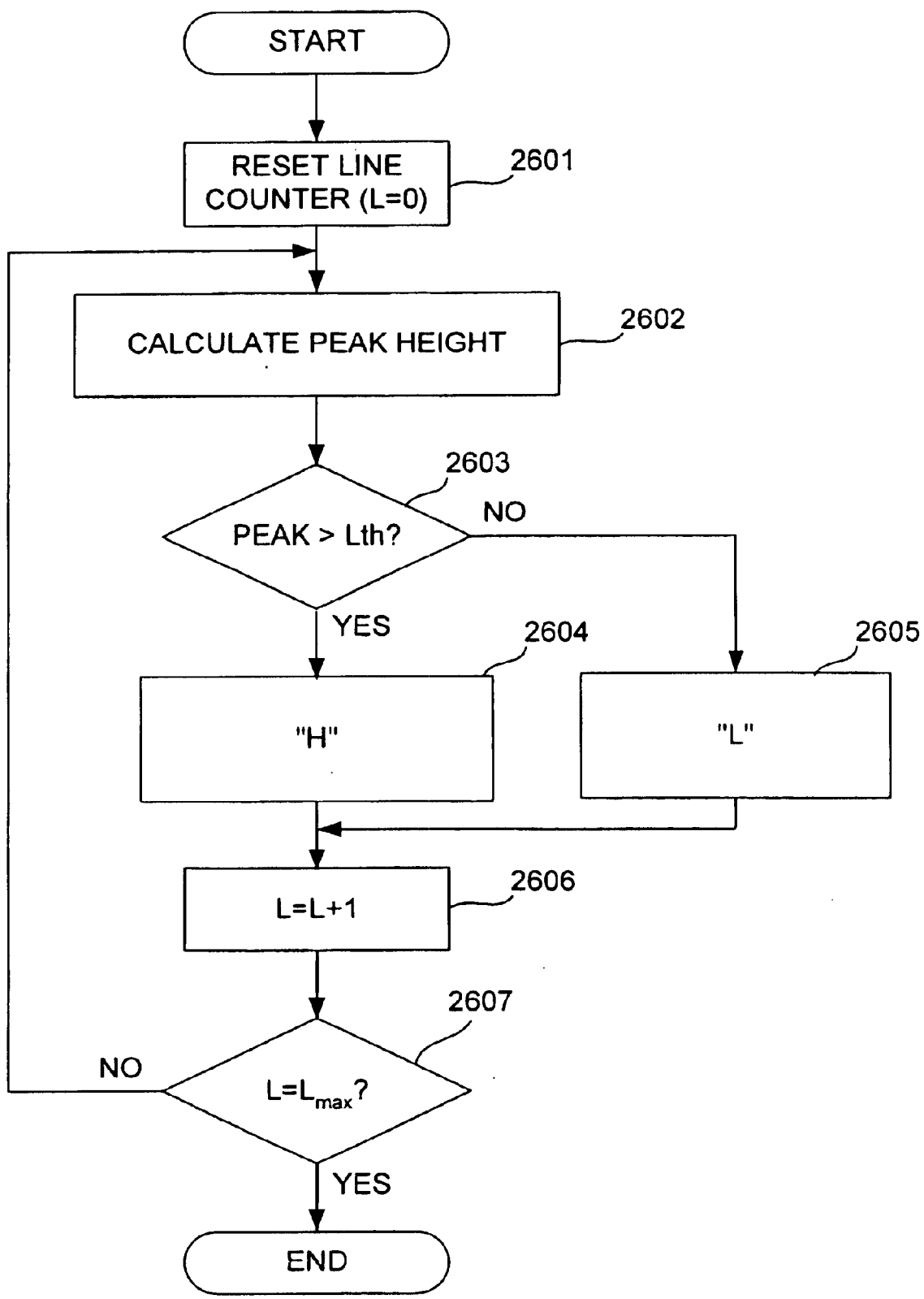
FIG. 26 is a flowchart for a segmentation process.

After a standard threshold value $L_{th}$ has thus been set (Step 2501), this value is used to segment the target object 5 by a segmentation process (Step 2502) shown in FIG. 26, starting by resetting the line counter (L=0) to specify a horizontal line in the image (Step 2601). Next, the peak height in the horizontal line specified by the line counter L is calculated (Step 2602) and checked if it exceeds the threshold value $L_{th}$ (Step 2603). If the peak height exceeds the threshold value $L_{th}$ (YES in Step 2603), the peak position is indicated as "H" (Step 2604). If the peak height is less than the threshold value $L_{th}$ (NO in Step 2603), the peak position is indicated as "L" (Step 2605). In the above, the peak position is indicative of the height of the target object on the horizontal scan line.

Figure 27:
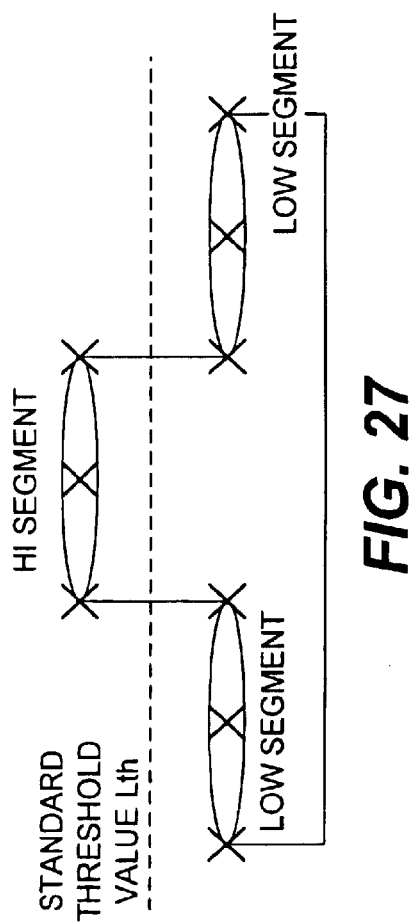
FIG. 27 shows how a target object is divided into high and low segments by the segmentation process.

The above steps are repeated thereafter by incrementing the value of the line counter L by +1 (Step 2606) until the value of the line counter L reaches its maximum value $L_{max}$ (YES in Step 2607). After this segmentation routine, the horizontal portions lower than the threshold value $L_{th}$ are recognized as LOW segments and the portion higher than the threshold value $L_{th}$ is recognized as HI segment, as shown in FIG. 27.

Figure 28:
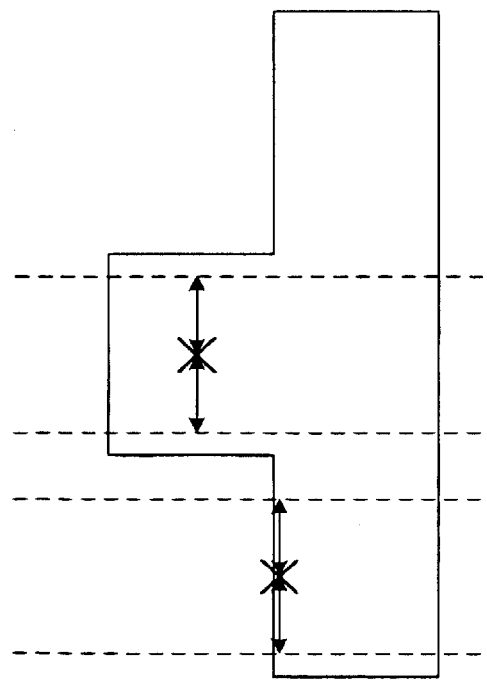
FIG. 28 shows how target surface areas of segments are determined.

Thereafter, edge positions of each of the HI and LOW segments as well as their mid-points (indicated by crosses in FIG. 27) are defined (Step 2503). Still thereafter, a target area for measurement on each of the LOW and HI segments is defined by extending from each of these mid-points by a specified distance, as indicated by double-headed arrows in FIG. 28 (Step 2504). Finally, as explained before, the average height $H_{st}$ of the LOW segments, the average height $H_{meg}$ of the HI segment, and their difference are calculated to obtain the height of the mesa.

Figure 30:
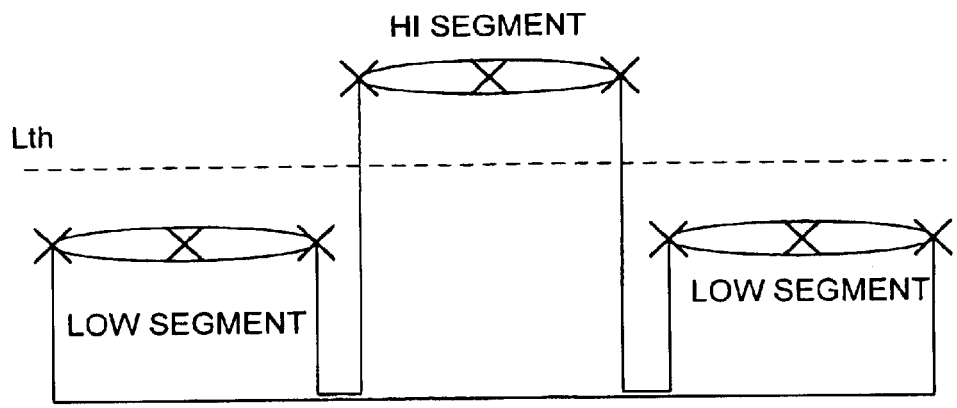
FIG. 30 shows how the depth of an indentation is measured.

With a routine as explained above, the finally determined target areas on the individual segments move with the relative horizontal motion of the target object with respect to the sensor head unit such that the height of a mesa on the target object can be measured reliably in spite of a horizontal displacement of the target object. This routine against horizontal displacement of the target object is also applicable for the measurement of the depth of an indentation. In the example shown in FIG. 30, the center position of each of HI and LOW segments is obtained and the region between the edge positions of the segments is identified as a groove area. Thereafter, a target area is set in this groove area such that the displacement of the target area from the groove area can be prevented.

Figure 31A:
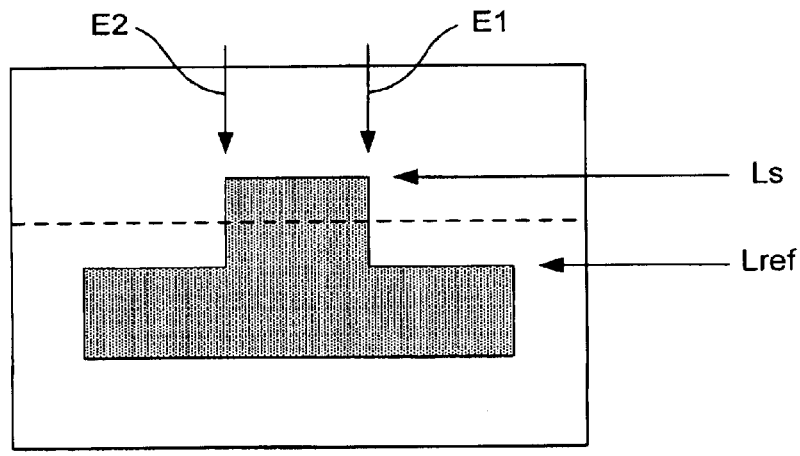
FIGS. 31A and 31B show how a vertical displacement of the target object can affect the measurement of the width of a mesa on the target object.
Figure 31B:
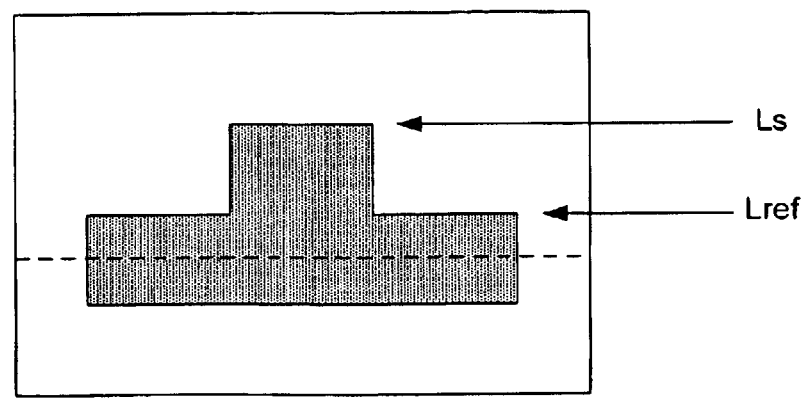

The invention also provide a routine for a situation where the target object may undergo a vertical displacement while the width of a mesa thereon is being measured. The width of a mesa is measured generally by selecting a threshold value $L_{th}$ between the reference surface $L_{ref}$ of the mesa, or the surface from which the mesa protrudes upward, and the top surface $L_s$ of the mesa. Edge positions $E_1$ and $E_2$ are thereby detected and the separation between the two edge positions $E_1$ and $E_2$ is accepted as the width of the mesa. If the target object undergoes a vertical displacement, as shown in FIG. 31B, however, the height of the threshold value $L_{th}$ moves off the vertical extension of the mesa and the edge positions $E_1$ and $E_2$ can no longer be detected and hence the width of the mesa cannot be determined.

Figure 32:
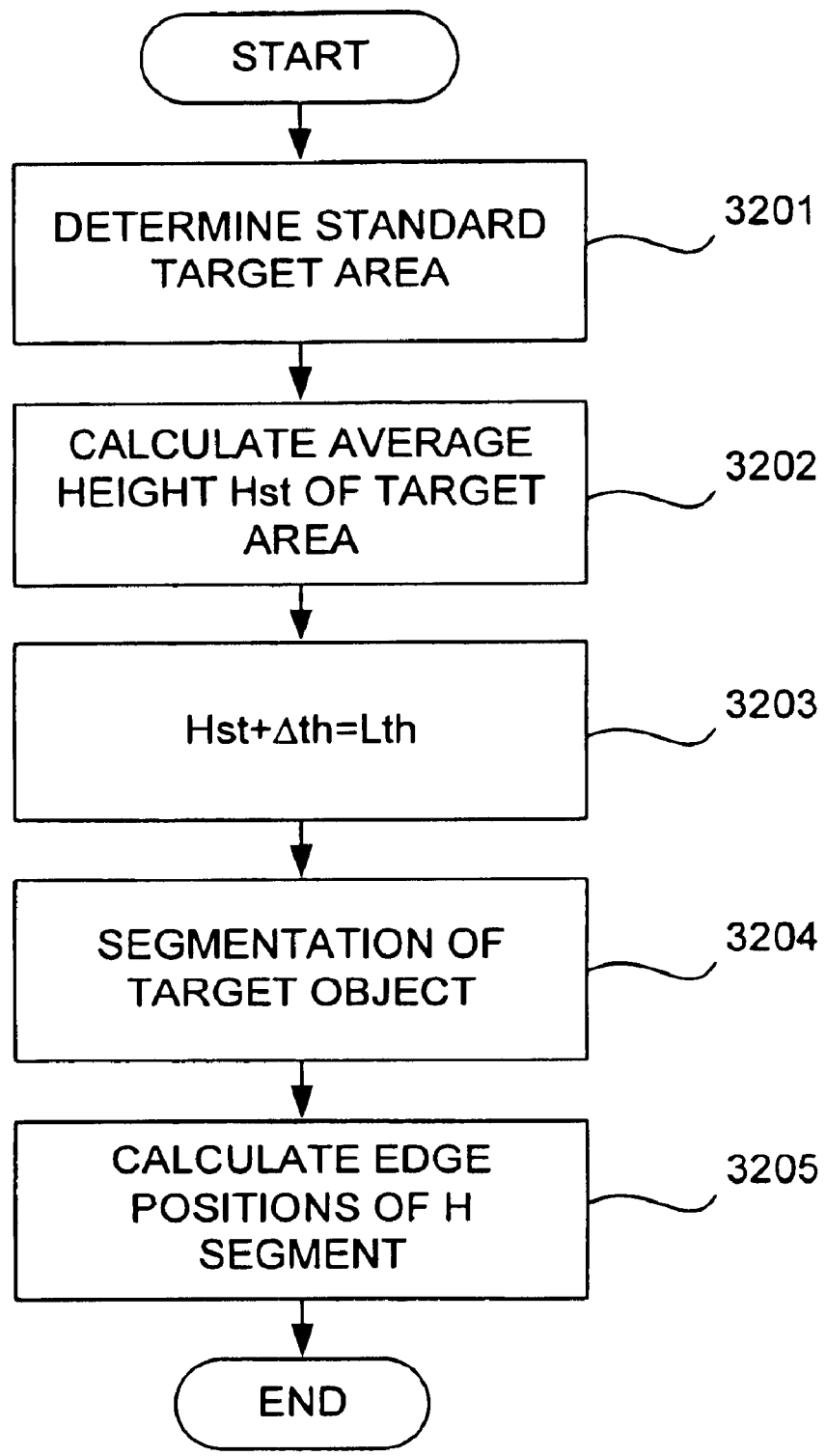
FIG. 32 is a flowchart of a process against a vertical displacement of the target object.
Figure 33A:
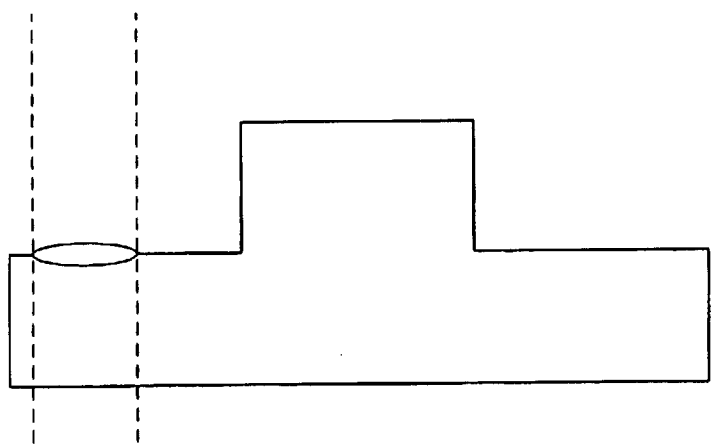
FIGS. 33A and 33B show how a standard target area is determined in the process of FIG. 32.
Figure 33B:
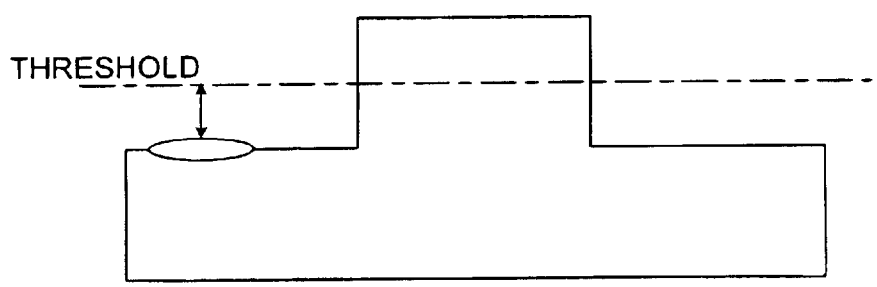
Figure 34A:
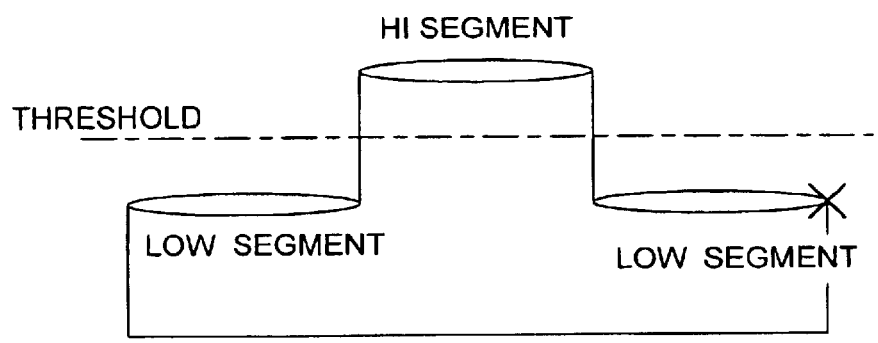
FIGS. 34A and 34B show how the relative threshold may be used in the process of FIG. 32.
Figure 34B:
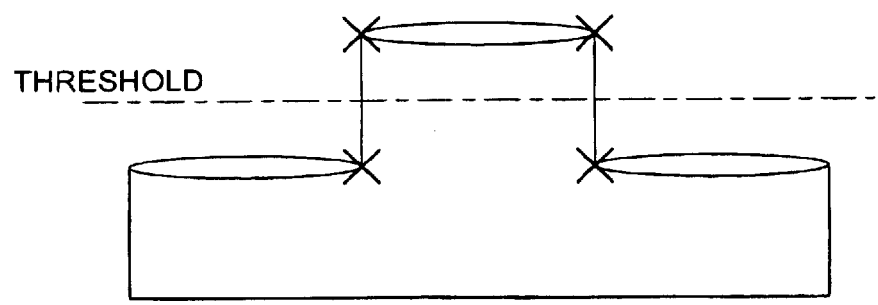

FIG. 32 shows a process to be followed according to this invention as a measure against such effects of a vertical displacement of the target object. Firstly, a standard target area is determined such that it will not be affected by a vertical displacement of the target object (Step 3201) as shown in FIG. 33A. Next, the average height $H_{st}$ of this standard target area is calculated (Step 3202), and a preliminarily determined offset value Δth is added to this average height $H_{st}$ to obtain a relative threshold value $L_{th}$ (Step 3203), as shown in FIG. 33B. Next, as shown in FIG. 34A, the target object is segmented (Step 3204) as described above with reference to FIG. 27 by using the newly defined relative threshold value $L_{th}$. Finally, the width of the mesa is calculated from the two end positions of the HI segment (Step 3205), as shown in FIG. 34B. By this method, the standard reference value $L_{th}$ keeps (hanging as the target object is displaced vertically and the width of the mesa is always measurable.

Figure 35:
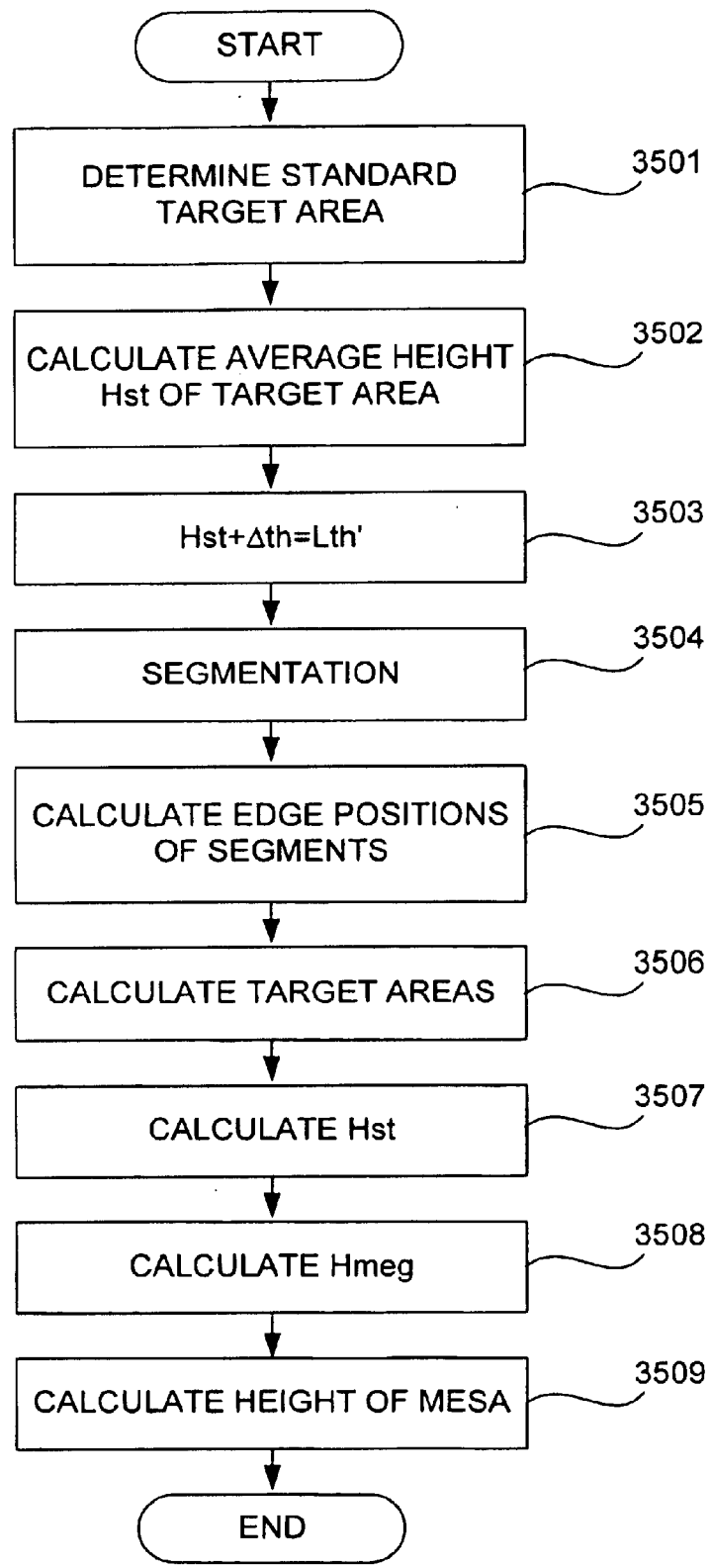
FIG. 35 is a flowchart of a process against a displacement of the target object in both horizontal and vertical directions.

For a situation where the target object is likely to be displaced both vertically and horizontally, a process as shown in FIG. 35 may be used. Firstly, a standard target area is selected as shown in FIG. 36A which will be measurable as long as the displacement of the target object is within a specified limit (Step 3501). Secondly, the average height $H_{st}$ of all lines that are included in this standard target area is calculated (Step 3502). Thirdly, as shown in FIG. 36B, a predetermined offset value Δth is added to the average height $H_{st}$ to obtain a relative threshold value $L_{th}'$ (Step 3503). Fourthly, as shown in FIG. 37A, the target object is segmented as explained above by using the relative threshold value $L_{th}'$ (Step 3504). Fifthly, as shown in FIG. 37B, the edge positions and the center positions of the HI and LOW segments are calculated (Step 3505). Sixthly, as shown in FIG. 37C, a target area on the LOW segment to serve as the reference surface and another target area on the HI segment representing the mesa on the target object are calculated (Step 3506). After the height $H_{st}$ of the LOW segment is calculated (Step 3507) and the height $H_{meg}$ of the HI segment is calculated (Step 3508), their difference is obtained as the height of the mesa (Step 3509).

With a process as described above, the target areas keep moving according to the displacement of the target object either horizontally or vertically such that the target areas of measurement remain measurable.

Figure 38:
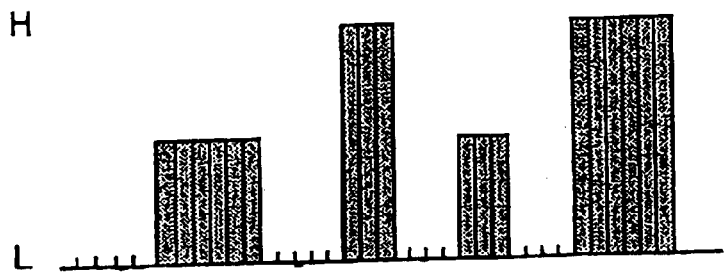
FIGS. 38, 39A, 39B and 40 are diagrams for explaining the image repairing processes.
Figure 39A:
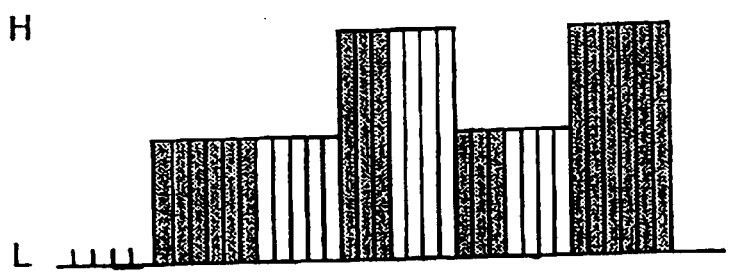
Figure 39B:
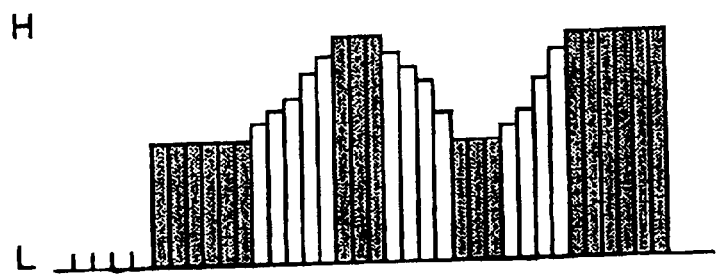

Areas not measurable can appear on a synthesized image, as shown in FIG. 38, not only because of a relative displacement between the sensor head unit and the target object but also because of noise which may prevent the finalization of image data on one or more lines on the synthesized image. The present invention provides repair methods for preventing the occurrence of such areas. FIG. 39A shows a repair method whereby each of the unmeasurable regions in the height distribution diagram is "filled" with (or replaced by) a height of the adjoining region on a preliminarily selected side (left-hand side in the example of FIG. 39A). FIG. 39B shows another repair method whereby unmeasurable regions are filled such that the height distribution around these regions will change smoothly and connect smoothly to the adjoining regions.

Figure 40:
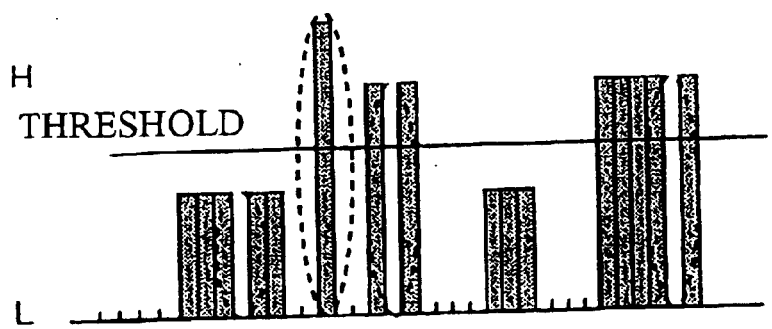
Figure 41A:
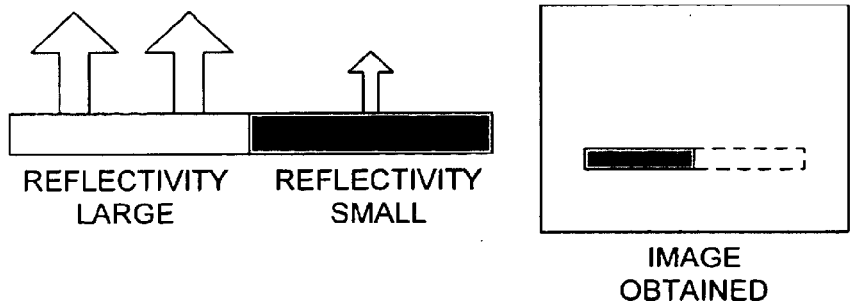
FIGS. 41A, 41B, 42A and 42B are sketches for showing how unsatisfactory images of an object can result with a prior art optical sensor.
Figure 41B:
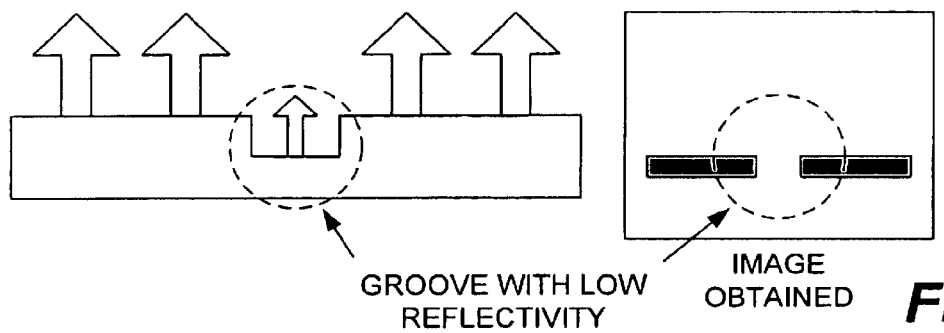
Figure 42A:
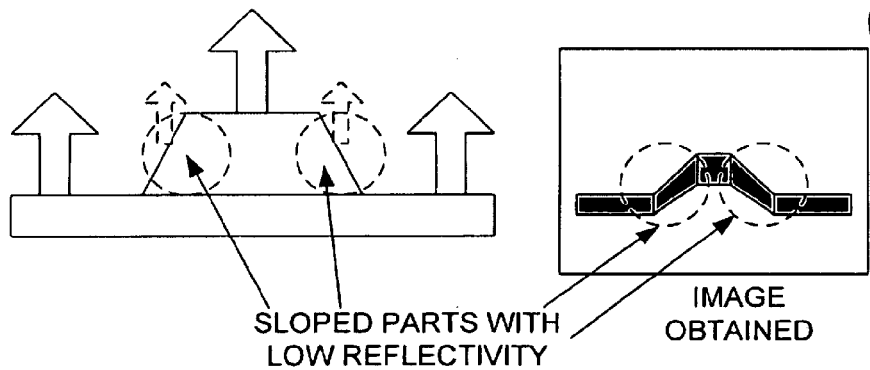
Figure 42B:
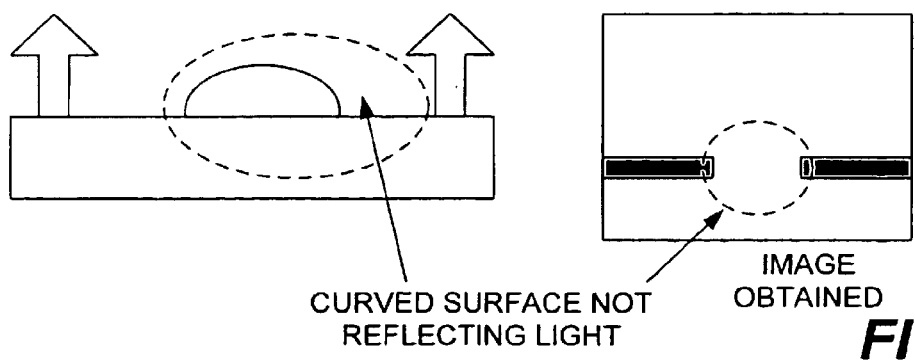

If erroneous data are included due to noise, as shown surrounded by a broken line in FIG. 40, they may be compared with a specified threshold value to check the continuity in brightness and replaced by a segment with the same height as the adjoining region only if continuity is established.

In summary, optical sensors of this invention can measure a sectional contour line accurately even with a target object having varying reflectivity, a groove, a sloped portion or a curved surface.

What is claimed is:

1. An optical displacement sensor comprising:
    multi-imaging means including a light projecting means, an image taking means and a parameter scanning means, said light projecting means being for providing a slit beam of light and projecting said slit beam of light onto a target surface of a target object at a specified angle, said image taking means being for obtaining contour-including images including an image of a sectional contour line by an optical sectional surface by using a two-dimensional image taking element at another angle different from said specified angle to photograph said target surface where said slit beam of light is made incident, said parameter scanning means being for scanning the brightness of said contour-including images by varying the value of at least one of parameters that define image taking conditions affecting the brightness of said contour-including images obtained through said image taking means, said multi-imaging means serving to obtain a plurality of said contour-including images under different image taking conditions;
    image synthesizing means for extracting from a plurality of said contour-including images obtained by said multi-imaging means a segmented image satisfying a specified maximum brightness condition for each of predetermined segments and generating a synthesized image including a series of portions of the image of said sectional contour line by gathering said extracted segmented images, said predetermined segments each consisting of an area including one or more mutually adjacent horizontal scan lines on an image obtained by said two-dimensional image taking element; and
    measuring means for carrying out a specified measuring process based on said series of portions of the images of said sectional contour line and generating a value representing a result obtained by said specified measuring process.

2. The optical displacement sensor of claim 1 wherein said measuring means measures the distribution of distance between said multi-imaging means and said target surface along a line including where said slit beam is made incident.

3. The optical displacement sensor of claim 1 wherein said parameters include shutter time of said two-dimensional image taking element.

4. The optical displacement sensor of claim 1 wherein said parameters are changed in variable units.

5. The optical displacement sensor of claim 1 wherein said parameters are changed within a variable maximum range.

6. The optical displacement sensor of claim 1 wherein said parameters are changed within a maximum range, said maximum range being automatically set according to results of a test measurement.

7. The optical displacement sensor of claim 1 wherein said parameters are changed within a maximum range in specified units, said sensor including means for automatically adjusting said maximum range and said specified units according to the brightness of the image of said sectional contour line taken by said sensor.

8. The optical displacement sensor of claim 1 wherein said image synthesizing means includes:
    an image memory for storing image of one screen portion of said two-dimensional image taking element, said image memory being divided into segments;
    a flag memory for storing write-control flags indicating whether or not a write-in is allowed to each of these segments of said image memory;
    an image recording means for recording images obtained by said multi-imaging means into said image memory in units of the segments according to said write-control flags; and
    a flag control means for controlling said write-control flags such that after a segmented image satisfying said specified maximum brightness condition is recorded in each of the segments of said image memory, the write-in into the corresponding segment is inhibited.

9. The optical displacement sensor of claim 8 wherein said multi-imaging means stops obtaining said contour-including images when the segmented images satisfying said specified maximum brightness condition have been recorded into all of specified ones of said segments of said image memory.

10. The optical displacement sensor of claim 8 wherein said predetermined segments each consist of an area including one or more mutually adjacent horizontal scan lines.

11. The optical displacement sensor of claim 1 wherein said multi-imaging means is contained in a housing structure to form a sensor head unit and said image synthesizing means and said measuring means are contained in another housing structure to form a signal processing unit.

12. The optical displacement sensor of claim 1 further comprising an image monitor which is externally connected to said signal processing unit.

13. The optical displacement sensor of claim 1 further comprising image repairing means for repairing a missing portion of the image of said sectional contour line in said synthesized image generated by said image synthesizing means.

14. The optical displacement sensor of claim 13 wherein said image repairing means sequentially detects the presence or absence of the image of a portion of said sectional contour line on each of scan lines forming said synthesized image and replaces the image of a scan line with missing image of said sectional contour line with the image of the scan line immediately before.

15. The optical displacement sensor of claim 13 wherein said image repairing means sequentially detects the presence or absence of the image of a portion of said sectional contour line on each of scan lines forming said synthesized image and replaces the image of a scan line with missing image of said sectional contour line by using the images of the scan lines before and after.

16. The optical displacement sensor of claim 13 wherein said image repairing means sequentially detects the presence or absence of the image of a portion of said sectional contour line on each of scan lines forming said synthesized image and replaces or does not replace the image of a scan line, depending on the continuity of brightness with the images of said sectional contour line on lines before and after.

17. The optical displacement sensor of claim 1 further comprising monitor output means for generating output signals for displaying a specified image on an image monitor.

18. The optical displacement sensor of claim 17 wherein said specified image includes said synthesized image.

19. The optical displacement sensor of claim 18 wherein said specified image includes a cursor which indicates one of horizontal scan lines forming said synthesized image and a brightness distribution curve of one of said scan lines selected by said cursor.

20. The optical displacement sensor of claim 18 wherein said specified image includes a cursor which indicates one of horizontal scan lines selected from said synthesized image and image taking conditions for one of said scan lines selected by said cursor.

21. The optical displacement sensor of claim 18 wherein said specified image includes a mark on each of horizontal scan lines forming said synthesized image indicating absence of image of said sectional contour line.

22. The optical displacement sensor of claim 18 wherein said specified image includes a mark on each of horizontal scan lines forming said synthesized image indicating presence of image of said sectional contour line.

23. The optical displacement sensor of claim 17 further comprising a graphical user interface for holding conversation between an operator and said image monitor through a pointing device.

24. The optical displacement sensor of claim 1 further comprising tracking control means for changing target position for measurement according to relative motion of said target object.

25. The optical displacement sensor of claim 24 wherein said target position is for measuring the distance between said multi-imaging means and said target surface and wherein said relative motion is perpendicular to the direction in which said distance changes.

26. The optical displacement sensor of claim 24 wherein said target position is for measuring the distance between said multi-imaging means and said target surface and wherein said relative motion is in the direction in which said distance changes.

27. The optical displacement sensor of claim 24 wherein said target position is for measuring the distance between said multi-imaging means and said target surface and wherein said relative motion is both in and perpendicular to the direction in which said distance changes.

28. A signal processing device to be connected to a multi-imaging means, said multi-imaging including a light projecting means, an image taking means and a parameter scanning means, said light projecting means being for providing a slit beam of light and projecting said slit beam of light onto a target surface of a target object at a specified angle, said image taking means being for obtaining contour-including images including an image of a sectional contour line by an optical sectional surface by using a two-dimensional image taking element at another angle different from said specified angle to photograph said target surface where said slit beam of light is made incident, said parameter scanning means being for scanning the brightness of said contour-including images by varying the value of at least one of parameters that define image taking conditions affecting the brightness of said contour-including images obtained through said image taking means, said multi-imaging means serving to obtain a plurality of said contour-including images under different image taking conditions; said signal processing unit comprising:

image synthesizing means for extracting from a plurality of said contour-including images obtained by said multi-imaging means a segmented image satisfying a specified maximum brightness condition for each of predetermined segments and generating a synthesized image including a series of portions of the image of said sectional contour line by gathering said extracted segmented images, said predetermined segments each consisting of an area including one or more mutually adjacent horizontal scan lines on an image obtained by said two-dimensional image taking element; and measuring means for carrying out a specified measuring process based on said series of portions of the images of said sectional contour line and generating a value representing a result obtained by said specified measuring process;

said signal processing device measuring a cross-section of said target object.

29. The signal processing unit of claim 28 contained in a housing structure to be formed as a signal processing unit.

30. An optical displacement sensor comprising:

multi-imaging means including a light projecting means, an image taking means and a parameter varying, said light projecting means being for providing a slit beam of light and projecting said slit beam of light onto a target surface of a target object at a specified angle, said image taking means being for obtaining contour-including images including an image of a sectional contour line by an optical sectional surface by using a two-dimensional image taking element at another angle different from said specified angle to photograph said target surface where said slit beam of light is made incident, the contour-including image formed by said slight beam moving on light-receiving surface of said two-dimensional image taking element perpendicularly to the sectional surface of said slit beam when the distance to said target surface changes, said parameter varying means being for scanning the brightness of said contour-including images by varying the value of at least one of parameters that define image taking conditions affecting the brightness of said contour-including images obtained through said image taking means, said multi-imaging means serving to obtain a plurality of said contour-including images under different image taking conditions;

image synthesizing means for extracting from a plurality of said contour-including images obtained by said multi-imaging means a segmented image satisfying a specified maximum brightness condition for each of segments that each consist of an area including image data corresponding to one line in an image obtained by said two-dimensional image taking element; and measuring means for carrying out a specified measuring process based on said series of portions of the images of said sectional contour line and generating a value representing a result obtained by said specified measuring process.

31. An optical displacement sensor comprising:

multi-imaging means including a light projecting means, an image taking means and a parameter varying, said light projecting means being for providing a slit beam of light and projecting said slit beam of light onto a target surface of a target object at a specified angle, said image taking means being for obtaining contour-including images including an image of a sectional contour line by an optical sectional surface by using a two-dimensional image taking element at another angle different from said specified angle to photograph said target surface where said slit beam of light is made incident, the contour-including image formed by said slight beam moving on light-receiving surface of said two-dimensional image taking element perpendicularly to the sectional surface of said slit beam when the distance to said target surface changes, said parameter varying means being for scanning the brightness of said contour-including images by varying the value of at least one of parameters that define image taking conditions affecting the brightness of said contour-including images obtained through said image taking means, said multi-imaging means serving to obtain a plurality of said contour-including images under different image taking conditions;

image synthesizing means for extracting from a plurality of said contour-including images obtained by said multi-imaging means a segmented image satisfying a specified maximum brightness condition for each of segments that each consist of an area including one or more mutually adjacent horizontal scan lines on an image obtained by said two-dimensional image taking element and generating a synthesized image including a series of portions of the image of said sectional contour line by gathering the extracted segmented images; and measuring means for carrying out a specified measuring process based on said series of portions of the images of said sectional contour line and generating a value representing a result obtained by said specified measuring process.

* * * * *